(12) United States Patent
Chang et al.

(10) Patent No.: US 10,359,583 B2
(45) Date of Patent: Jul. 23, 2019

(54) BEHIND THE WALL OPTICAL CONNECTOR WITH REDUCED COMPONENTS

(71) Applicant: SENKO Advanced Components, Inc., Marlborough, MA (US)

(72) Inventors: Jimmy Jun-Fu Chang, Worcester, MA (US); Kazuyoshi Takano, Southborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/926,263

(22) Filed: Mar. 20, 2018

(65) Prior Publication Data

US 2018/0292618 A1    Oct. 11, 2018

Related U.S. Application Data

(63) Continuation-in-part of application No. 15/847,875, filed on Dec. 19, 2017, now Pat. No. 10,209,461.

(60) Provisional application No. 62/482,790, filed on Apr. 7, 2017.

(51) Int. Cl.
*G02B 6/38* (2006.01)

(52) U.S. Cl.
CPC ......... *G02B 6/3898* (2013.01); *G02B 6/3825* (2013.01); *G02B 6/3874* (2013.01); *G02B 6/3887* (2013.01)

(58) Field of Classification Search
CPC .................................................. G02B 6/3825
See application file for complete search history.

(56) References Cited

U.S. PATENT DOCUMENTS

| 4,312,564 | A | 1/1982 | Cefarelli et al. |
| 4,327,964 | A | 5/1982 | Haesly et al. |
| 4,478,473 | A | 10/1984 | Frear |
| 4,762,388 | A | 8/1988 | Tanaka et al. |
| 4,764,129 | A | 8/1988 | Jones et al. |
| 4,840,451 | A | 6/1989 | Sampson et al. |
| 4,872,736 | A | 10/1989 | Myers et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Omar R Rojas
(74) *Attorney, Agent, or Firm* — Edward S. Jarmolowicz, Esq

(57) ABSTRACT

A behind-the-wall optical connector an outer housing configured to be inserted into an adapter with a corresponding inner surface, a ferrule included in an annular collar to mate with a corresponding projection at an adapter opening, and a latch attached to one side of housing configured to lock the connecter into an adapter opening. The latch is further configured with a locking channel and guide to accept a pull tab with a catch at one end, the pull tab releases the connector from the adapter opening when the tab is pulled rearward or away from the adapter.

8 Claims, 32 Drawing Sheets

(56) References Cited

U.S. PATENT DOCUMENTS

| | | |
|---|---|---|
| 4,979,792 A | 12/1990 | Weber et al. |
| 5,041,025 A | 8/1991 | Haitmanek |
| D323,143 S | 1/1992 | Ohkura et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 8/1994 | Newman et al. |
| 5,348,487 A | 9/1994 | Marazzi et al. |
| 5,414,790 A * | 5/1995 | Lee .................. G02B 6/3849 385/134 |
| 5,444,806 A | 8/1995 | deMarchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| 7,903,922 B2 * | 3/2011 | Momotsu .............. G02B 6/3897 385/135 |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese, Jr. et al. |
| 8,770,863 B2 | 7/2014 | Cooke et al. |
| 9,188,747 B2 | 11/2015 | Gniadek |
| 9,411,110 B2 | 8/2016 | Barnette et al. |
| 9,494,744 B2 | 11/2016 | de Jong |
| 9,548,557 B2 | 1/2017 | Liu |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,684,313 B2 | 6/2017 | Cline et al. |
| 2003/0053787 A1 | 3/2003 | Lee |
| 2003/0095754 A1 | 5/2003 | Matsumoto et al. |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0290938 A1 | 11/2009 | Lin |
| 2010/0034502 A1 | 2/2010 | Lu et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |

(56) References Cited

U.S. PATENT DOCUMENTS

| | | |
|---|---|---|
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0219621 A1 | 8/2014 | Barnette et al. |
| 2014/0226946 A1 | 8/2014 | Cooke et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0301294 A1 | 10/2015 | Chang |
| 2015/0355417 A1 | 10/2015 | Takano |
| 2015/0331201 A1 | 11/2015 | Takano et al. |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.
"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D484DAA363AEB7E&ei=ZvcvTujWH4ntrAfH-dXZCg&usg=AFQjCNE1MdC-4avewRJU6IDVc_WYbr0QQ.
"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Katalog¬Glenair¬LWL-1110.pdf.
"Fiber Optic Products Catalog" Nov. 2007, Tyco Electronics Corporation, Harrisburg, Pennsylvania, www.ampnetconnect.com/documents/Fiber%20Optics%20Catalog%201107.pdf.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Aug. 29, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Sep. 14, 2017 from related International Application No. PCT/US2015/059458, International Filing Date Nov. 6, 2015.
International Search Report (ISR) WO2008112986 dated Sep. 15, 2009.
ISR WO2012162385ISR dated Nov. 29, 2012.
ISR WO2014028527ISR dated Jul. 16, 2015.
ISR WO2015191024ISR dated Oct. 9, 2014.
ISR WO2015US57610ISR dated Sep. 22, 2016.
ISR WO2016176083ISR dated May 19, 2016.
ISR WO2016148741ISR dated Sep. 22, 2016.
Non-Final Office action for U.S. Appl. No. 15/847,875, dated Jun. 1, 2018, 9 pages.

* cited by examiner

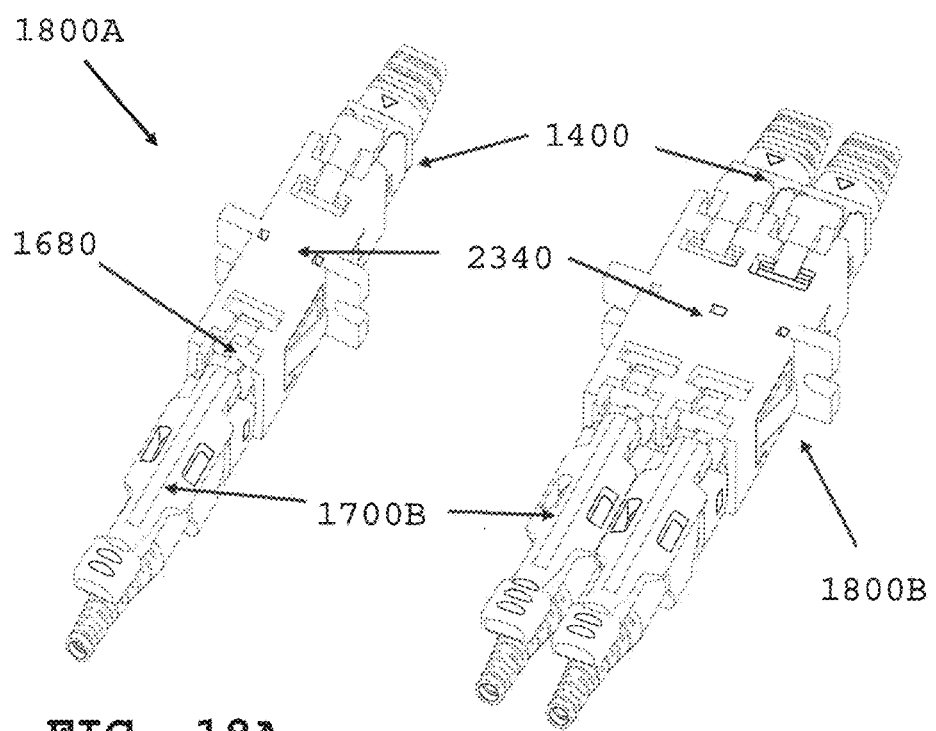

1900

1700B

1400

BEHIND THE WALL OPTICAL CONNECTOR WITH REDUCED COMPONENTS

RELATED APPLICATIONS

This application is a continuation-in-part of U.S. Ser. No. 15/847,875 filed on Dec. 19, 2017, titled "BEHIND THE WALL OPTICAL CONNECTOR WITH REDUCED COMPONENTS", claiming priority under 35 U.S.C. sec. 119(e) to U.S. Ser. No. 62/482,790 filed on Apr. 7, 2017 titled "BEHIND THE WALL OPTICAL CONNECTOR WITH REDUCED COMPONENTS", which is hereby incorporated by reference in their entirety.

BACKGROUND

The present disclosure field of invention relates generally to fiber optic connectors having a release. More specifically, the present disclosure relates to narrow width adapters and connectors, such as narrow pitch distance Lucent Connector (LC) duplex adapters and narrow width multi-fiber connectors.

The prevalence of the Internet has led to unprecedented growth in communication networks. Consumer demand for service and increased competition has caused network providers to continuously find ways to improve quality of service while reducing cost. Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels is still advancing.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. Thus, generally, more connectors are used in a high density array. As the numbers of connectors in a switching network increases, the associated cost of creating the switching network similarly increases. Generally, the construction of connectors includes the use of various components. The manufacturing process used to make these connectors and the components used to build them can greatly affect their cost per unit.

With high density switching networks and large data centers using thousands of these connectors, the cost per unit can have an extreme impact on the overall cost of designing and implementing a data center. Thus, if a new lower cost connector (e.g., a lower cost behind-the-wall (BTW) connector) could be developed, it could have a profound effect on the cost of building out a data center.

SUMMARY OF INVENTION

The present invention is directed to low-profile, reduced sized connector used in fiber optic networks. The connector is inserted into an adapter or transceiver receptacle to mate with an opposing fiber optic connector of the same type, or different configuration or electronics that convert the light signal over the fiber optic into an electrical signal, or vice versa.

The behind-the-wall connector has an outer housing shaped to be received in an adapter opening similarly configured to help align the connector before the connector is secured in the adapter. The connector has a release or latch with a recess that secures the connector in the adapter via an opening in the adapter housing. The connector release is integrated at one end of the connector housing, and extends beyond a second end. The second end of the release latches into the adapter opening.

In another embodiment, the release accepts a pull tab that removes the connector from the adapter housing. The pull tab snaps onto the release and is aligned with the release through a guide on the release that allows the pull tab to slidably move rearward to release the connector from the adapter.

In another embodiment a removal tool can be used to release the connector from the adapter housing. The removal tool is inserted onto the release via a protrusion that is placed through an opening in the release. The tool has an alignment tab that engages a corresponding channel on the release to guide the protrusion into the opening and help ensure the tool does not get jammed into the adapter port. The protrusion has a stop that engages a surface within the opening of the release.

In another embodiment, the adapter has a shroud at a first end that receives the second end of the BTW connector, the shroud inner surface is configured to engage an outer surface of the connector, and ferrule alignment sleeves are configured to engage corresponding ferrule opening with a ferrule therein, to connect the BTW connector with an opposing connector in the adapter.

Additional features and advantages of the invention will be set forth in the detailed description below, and in part apparent to those skilled in the art of the invention. It is understood that foregoing summary, drawings and detailed description are intended to provide a framework or overview for understanding the scope of the invention claimed.

BRIEF DESCRIPTION OF THE DRAWINGS

FIG. 18A is a perspective view of the connector of FIG. 17B inserted into a simplex adapter at a first end, according to the adapter of FIG. 15A and the connector of FIG. 17B inserted into the adapter at a second end.

FIG. 18B is a perspective view of the adapter of FIG. 15A, the adapter is configured as a duplex port adapter with a pair of connectors of FIG. 17B or FIG. 16B inserted into a first end of the adapter and a pair of connectors of FIG. 14 assembled and inserted into a second end of the adapter.

DETAILED DESCRIPTION

Figure 1:
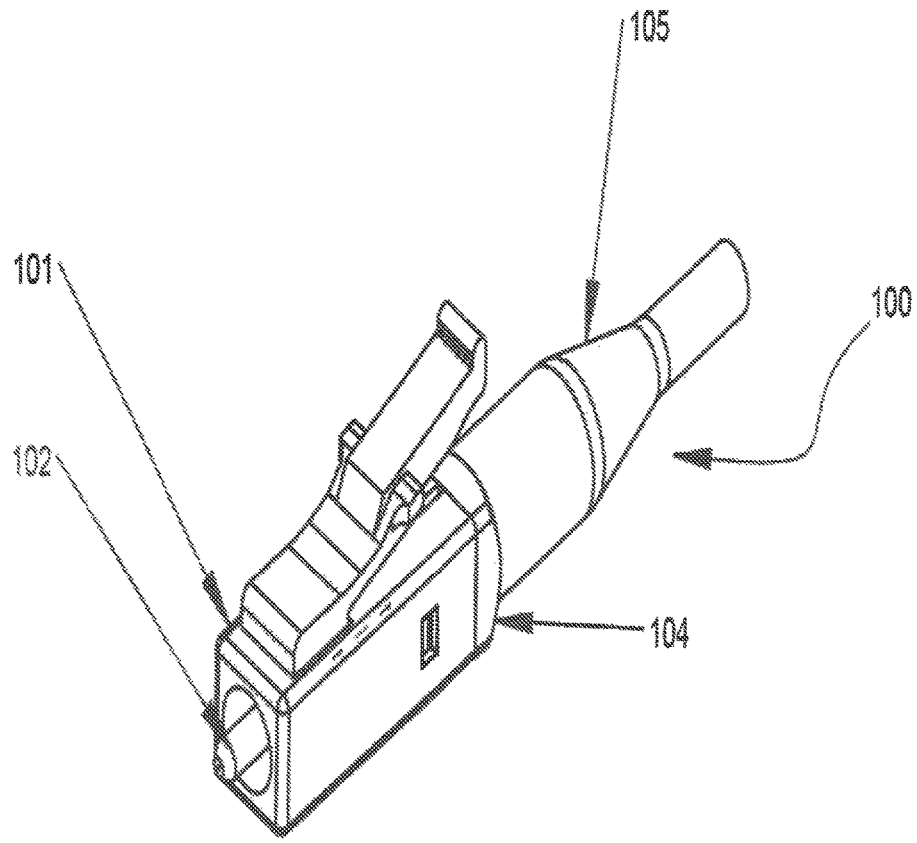
FIG. 1 is a perspective view of a typical behind-the-wall connector.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure axe not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connects a first module or cable to a second module or cable. The connector may be configured for fiber optic transmission or electrical transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, a straight tip (ST) connector, or a behind-the-wall (BTW) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Behind the wall connectors are important in today's crowded data centers. This connector is considered a small form factor or small footprint connector, that is, the overall length is reduced, compare, for example, FIG. 1 with FIGS. 3 and 5. The size decrease is from the ferrule or distal end to the end of the boot or proximal end of the connector. In this invention, behind-the-wall literally means the connector is placed behind a wall or panel, and the panels are stored in the rack that extend from the floor to the ceiling, and the racks of panels, each containing numerous adapters, are positioned near another rack with little or no distance between the racks. As such, the removal of connector structure is needed to allow the racks to be placed very close together, without degrading the reliability of the connector. In this invention the extender cap 204 is removed along with other components.

In an embodiment of the present invention, the spring was removed, and instead of replacing with a back post (not shown), a resilient latch (308, 408, 508, 608, 115) was designed. In another embodiment the spring (307, 407) is retained. The spring allows the ferrule flange to move more easily in response to stresses placed on the connector.

Other prior art connectors that remove the spring the ferrule from the front or distal end of the connector with an end cap or cover placed over the plug housing to hold the ferrule flange in place. The present invention inserts the ferrule flange and ferrule from the boot side or proximal end of the connector. This improves connector quality and operation because the pull force or the force one can exert on the connector when removing from the adapter is increased, and this reduces breakage when employing the resilient latch.

Various embodiments described herein generally provide a cost-reducing design for a fiber optic connector. In some embodiments, such as those discussed herein, various components of typically known connectors may be removed (e.g., an extender cap, a spring, a boot, etc.). Various embodiments may comprise different structure types for the connector, for example, some might be flexible, and others might be more rigid. Detailed examples of these connector types are shown in the figures, and discussed further herein.

Figure 2:
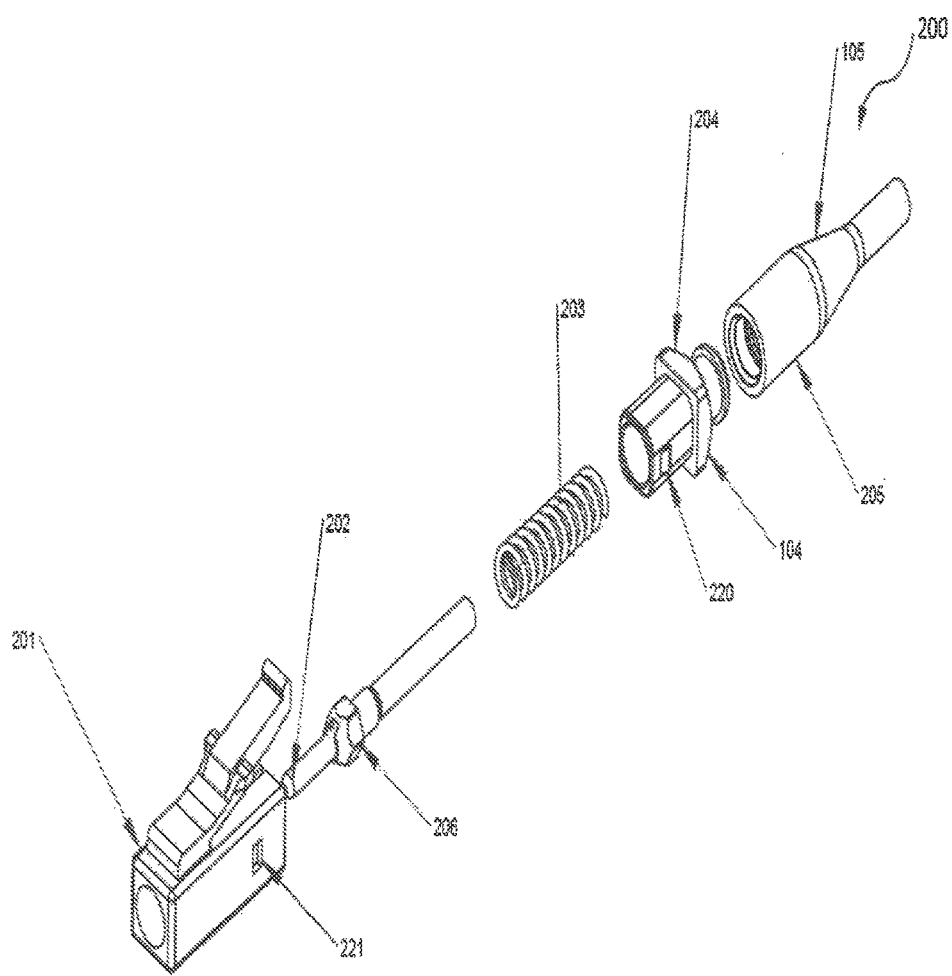
FIG. 2 is an exploded perspective view of a typical behind-the-wall connector.

FIG. 1 shows a perspective view of a standard behind-the-wall (BTW) connector 100. Generally, and as shown, a BTW connector may comprise a plug frame 101, a ferrule-flange 102, an extender cap 104, and a boot 105. As shown in FIG. 2, a BTW connector is comprised of various parts which are held together via mechanical interlock and/or spring tension. For example, as shown, a typical BTW connector may have a plug frame 201. The plug frame 201 comprises the majority of the external area of the connector. The plug frame 201 has an opening at both ends to allow for the insertion of additional components. One such component is the ferrule-flange 202, which is usually also accompanied by a flange tube 203. The ferrule-flange 202 is generally designed with an extended collar 206, which is designed to restrict the ferrule-flanges movement through the plug frame 201. Stated differently, the extended collar 206 keeps the ferrule 202 from falling completely through the plug frame 201 and out the front opening.

The BTW connector may also comprise a spring 203, which generally goes around at least a portion of the flange tube and/or the ferrule-flange 202 when combined. The spring 203 applies a tension to the ferrule-flange 202 to prevent it from protruding out of the plug frame 201 in order to maintain a good connection. However, the spring 203 may also provide some cushion so as to not break the ferrule 202 if improperly aligned. The spring 203 is then capped using an extender cap 204. The extender cap 204 has a fastening mechanism 220, which is designed to interlock with a cutout 221 in the plug frame 201. Finally, a boot 205 is placed over the extender cap 204.

Figure 3:
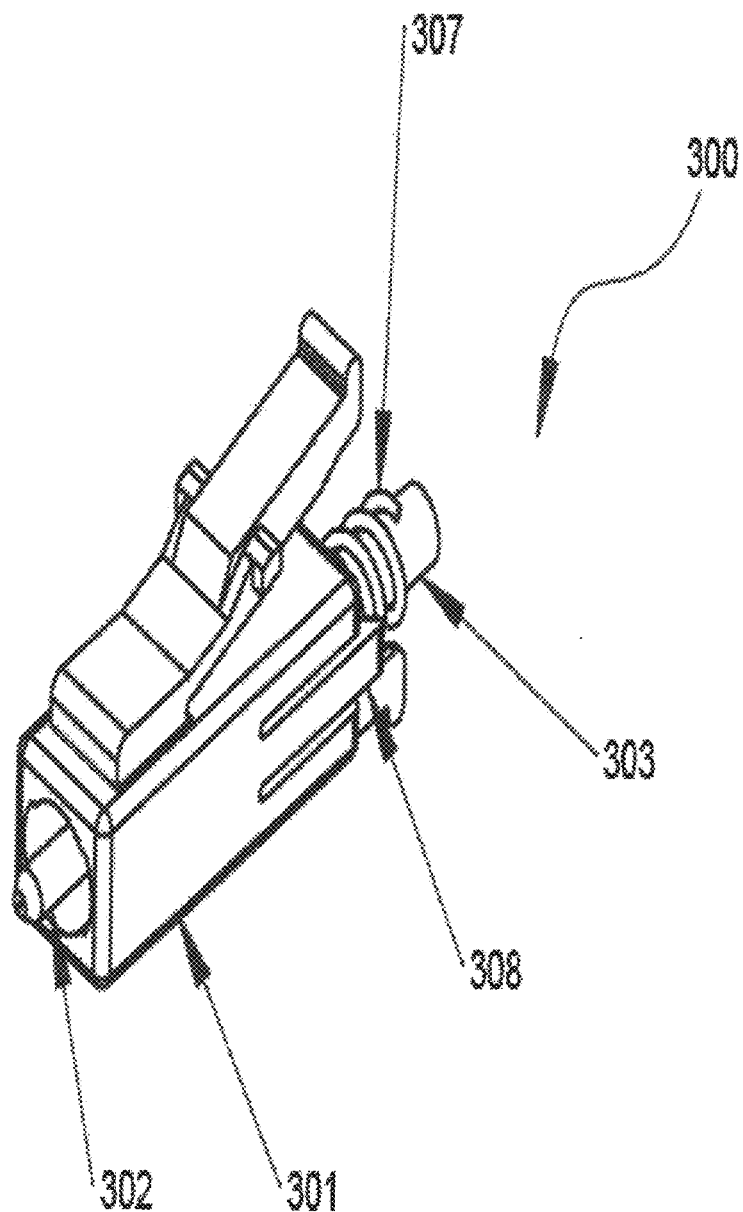
FIG. 3 is a perspective view of an embodiment of a redesigned behind-the-wall connector including a tension spring.

Thus, a large number of components are required to build a typical BTW connector. Removing some of these components or replacing them with similar but less complex analogues can reduce the cost of a connector. Accordingly, some embodiments may, as shown in FIG. 3 remove various components. FIG. 3 shows a BTW connector 300, which comprises a plug frame 301, a ferrule flange 302, a flange tube 303, and a spring 307. In some embodiments, and as shown in FIG. 3, the plug frame 301 may comprise a latching member 308. The latching member 308 may be flexibly rigid such that it can be moved via a tool or human pressure, but is rigid enough to hold the ferrule flange 302 in place in conjunction with the spring 307. Additionally or alternatively, some embodiments may consist essentially of a plug frame 301, a ferrule flange 302, a flange tube 303, a spring 307, and a latching member 308.

Specifically, in some embodiments, the latching member 308 may have a hook or protrusion (not shown) which may hook or latch onto one or more portions of the spring 307. Thus, as shown, the latching member 308 can hold the spring 307 in a fixed position, allowing the spring to exert horizontal pressure or tension onto the ferrule 302 ensuring proper placement of the ferrule.

Figure 4:
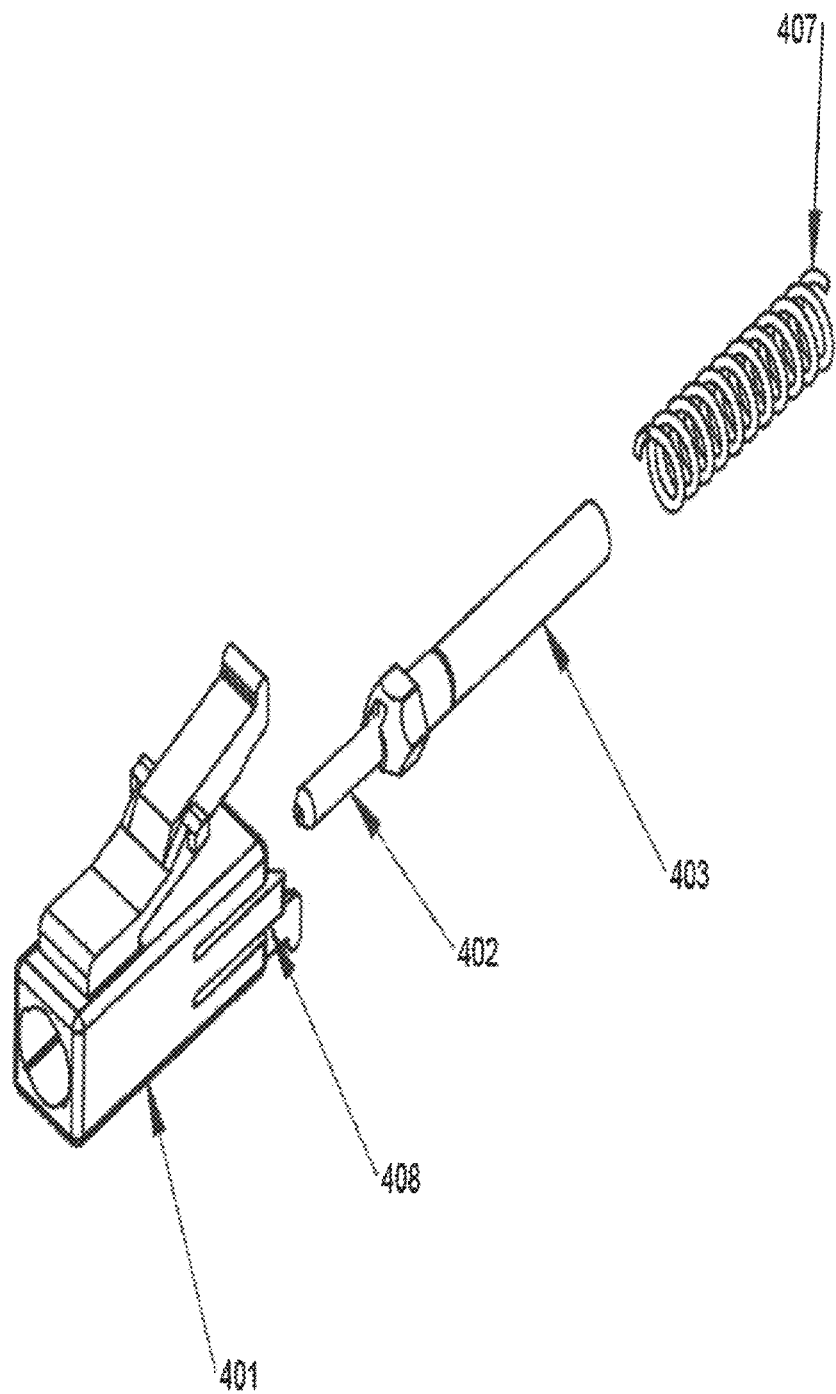
FIG. 4 is an exploded perspective view of an embodiment of a redesigned behind-the-wall connector including a tension spring.

FIG. 4 shows an exploded view of an embodiment comprising a plug frame 401, a ferrule flange 402, a flange tube 403, a spring, 407, and a latching member 408. Thus, some embodiments (e.g., the embodiments shown in FIGS. 3 and 4) may remove various components (e.g., the extender cap and boot) from the design. Removing these parts, reducing the cost of the connector, while also maintaining proper functionality is advantageous in almost any data center setting.

Figure 5:
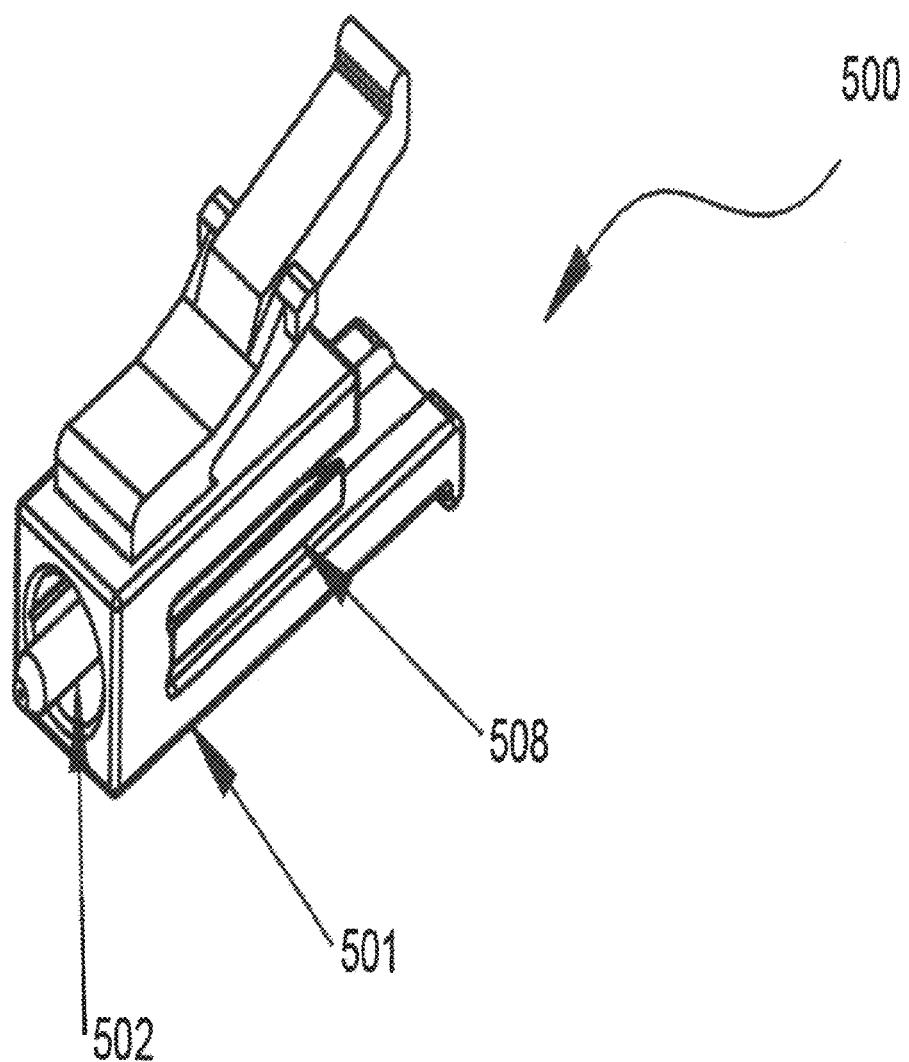
FIG. 5 is a perspective view of an embodiment of a redesigned behind-the-wall connector without a tension spring.

Referring now to FIG. 5, an example embodiment is shown having fewer components for connector design 500. As shown, the illustrative embodiment merely includes a plug frame 501 and a ferrule-flange 502. This embodiment is achievable as a result of the configuration of the latching member 508, and its relative position on the plug frame 501. Accordingly, some embodiments may consist essentially of a plug frame 501 and a ferrule flange 502.

Figure 6:
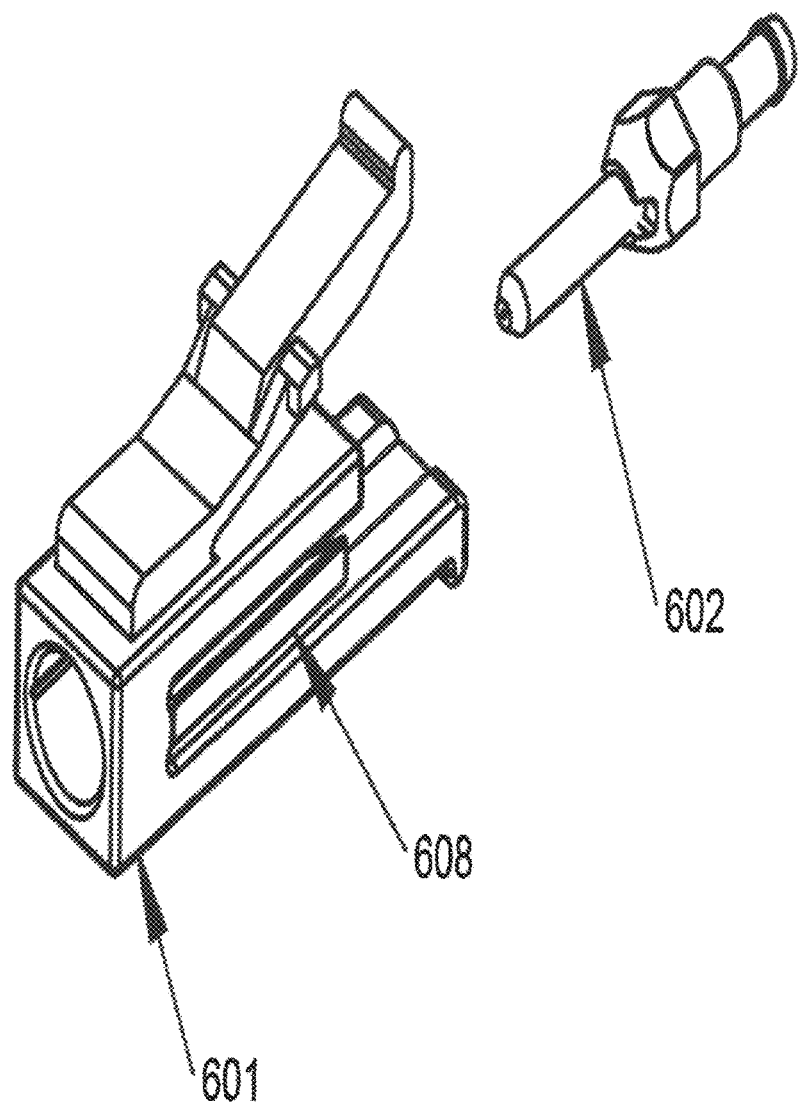
FIG. 6 is an exploded perspective view of an embodiment of a redesigned behind-the-wall connector without a tension spring.

FIG. 6 shows an exploded view of the connector design. As is clear from FIGS. 5 and 6, not only have the extender cap and boot been removed, but the spring and flange tube have been removed as well. This arrangement results from the latching member 608 of the plug frame 601 being designed in a manner to take advantage of the standard shape of the ferrule-flange 602. The exact interaction may be better understood with reference to FIG. 7.

Figure 7:
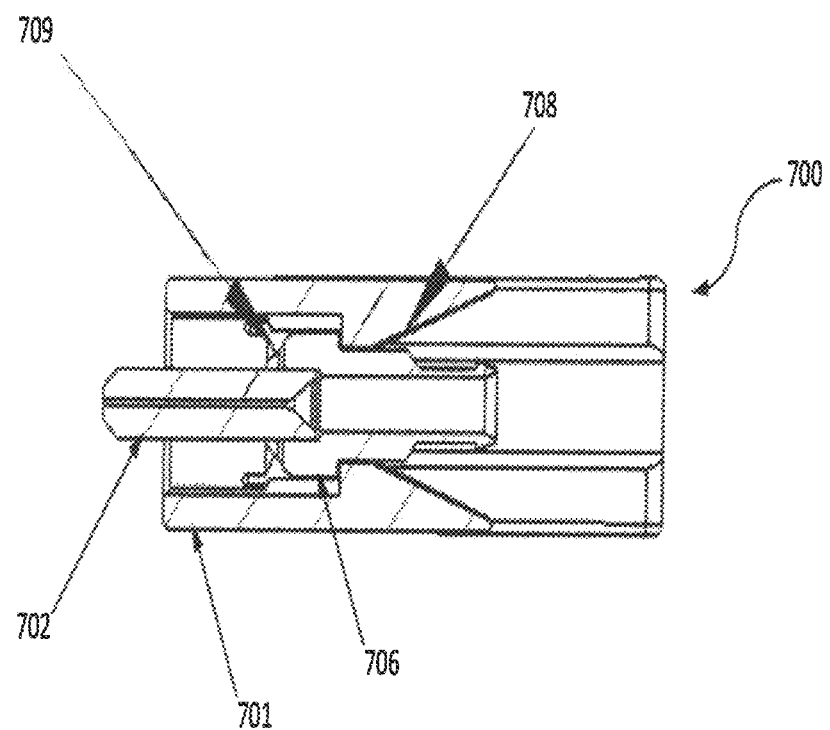
FIG. 7 is a detailed cross-sectional view of an embodiment of a redesigned behind-the wall connector without a tension spring.

As shown in FIG. 7, the ferrule-flange 702 is inside the plug frame 701. In some embodiments, the plug frame 701 may comprise one or more front stops 709. These front stops 709 prevent the ferrule-flange 702 from falling out the front opening of the plug frame 701. In addition, and as shown, the latching member 708 is closed around the extended collar 706 of the ferrule-flange 702. This interlocking system prevents the ferrule-flange from falling or being pushed (e.g., when making a connection) out of the back of the plug frame 701. As discussed herein, the latching member(s) 708 are flexible or elastic in nature, and thus can be moved using a tool, or a user. By moving the latching member 708 away from the side of the ferrule-flange 702 (e.g., applying outward pressure on the latching member to disengage it from the ferrule), the ferrule-flange may be removed via the rear opening of the plug frame 701.

Figure 8:
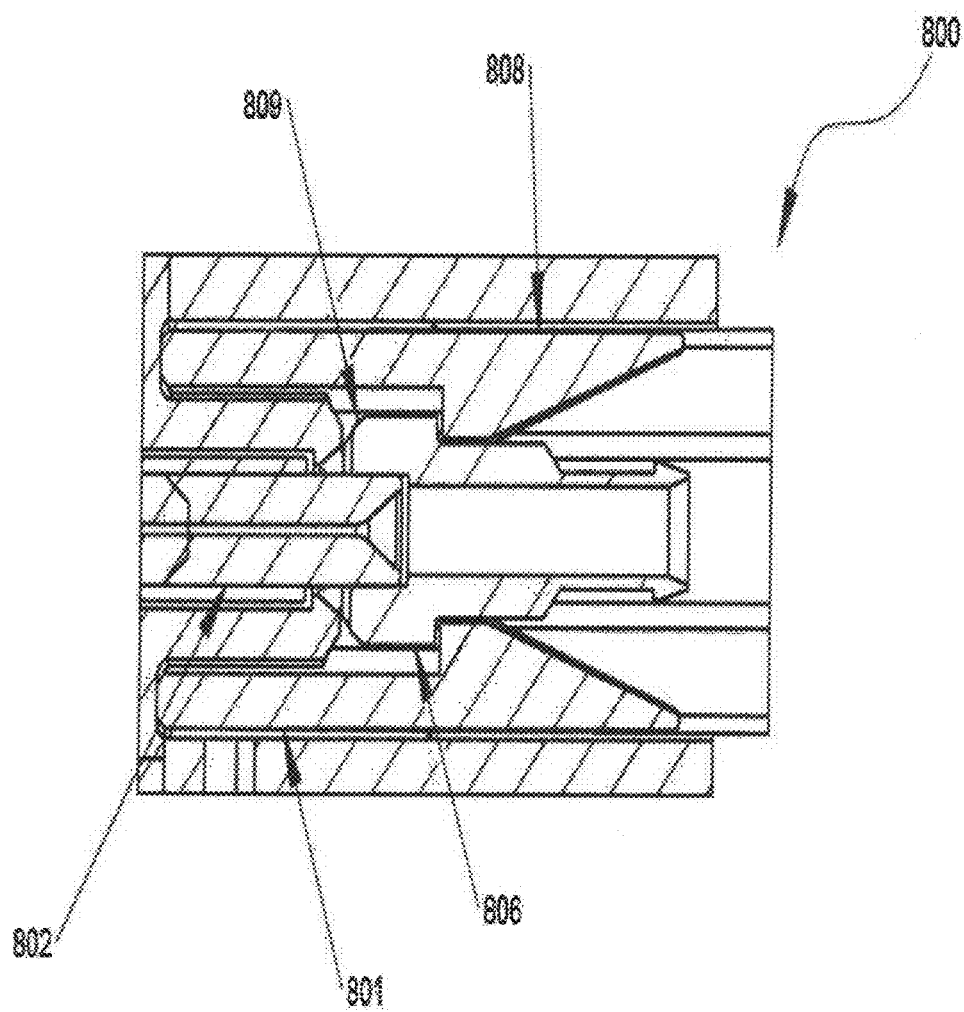
FIG. 8 is a zoomed-in detailed cross-sectional view of an embodiment of a redesigned behind-the wall connector without a tension spring.

FIG. 8 illustrates a zoomed-in and more detailed view of an embodiment of a BTW connector 800 similar to that of FIG. 7. As shown, the ferrule-flange 802 is within the plug frame 801, and held in place primarily by opposing forces placed upon the extended collar 806 of the ferrule. These opposing forces are applied via the front stop 809 acting upon the front of the extended collar 806 and the latching member 808 acting upon the back of the extended collar.

Figure 9:
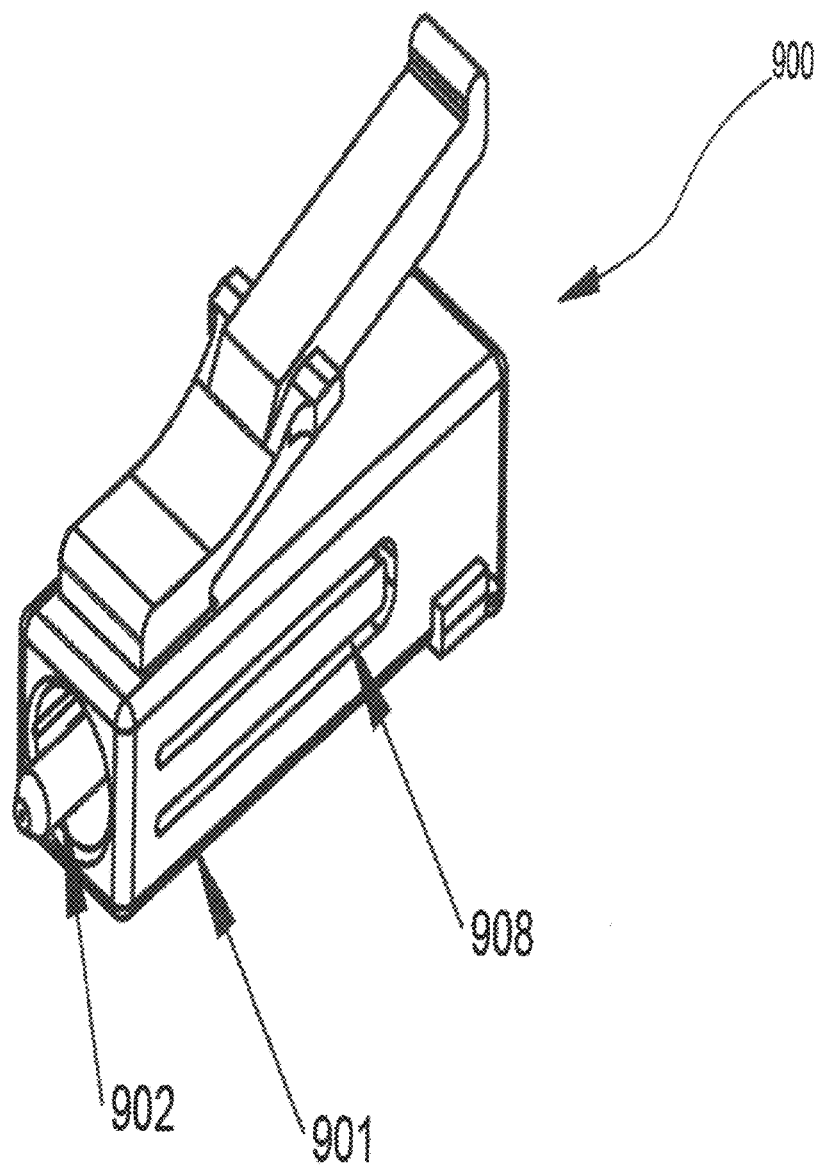
FIG. 9 is a perspective view of another embodiment of a redesigned behind-the-wall connector without a tension spring.

Referring to FIG. 9, an alternative embodiment of a connector system 900 is shown. As shown in FIG. 9, the plug frame 901 is larger and more robust that some other connectors discussed and illustrated herein. However, the ferrule-flange 902 is still held in place via means similar to those discussed in FIGS. 3-8. In this non-limiting example, the plug frame 901 comprises a latching member 908 which may interact with various connector components. For example, the latching member 908 may, as discussed herein, latch onto a portion of a spring thus imparting some lateral force upon the ferrule-flange 902. In addition or alternatively, the latching member 908 may latch or interact with the extended collar (not pictured) to apply a force to keep the ferrule-flange 902 within the plug frame 901. Some embodiments may consist essentially of a plug frame 901, a ferrule flange 902, and a latching member 908. In addition or alternatively, some embodiments may consist essentially of a plug frame 901 and a ferrule flange 902, a flange tube (not shown), a spring 907 (not shown), and a latching member 908.

Figure 10:
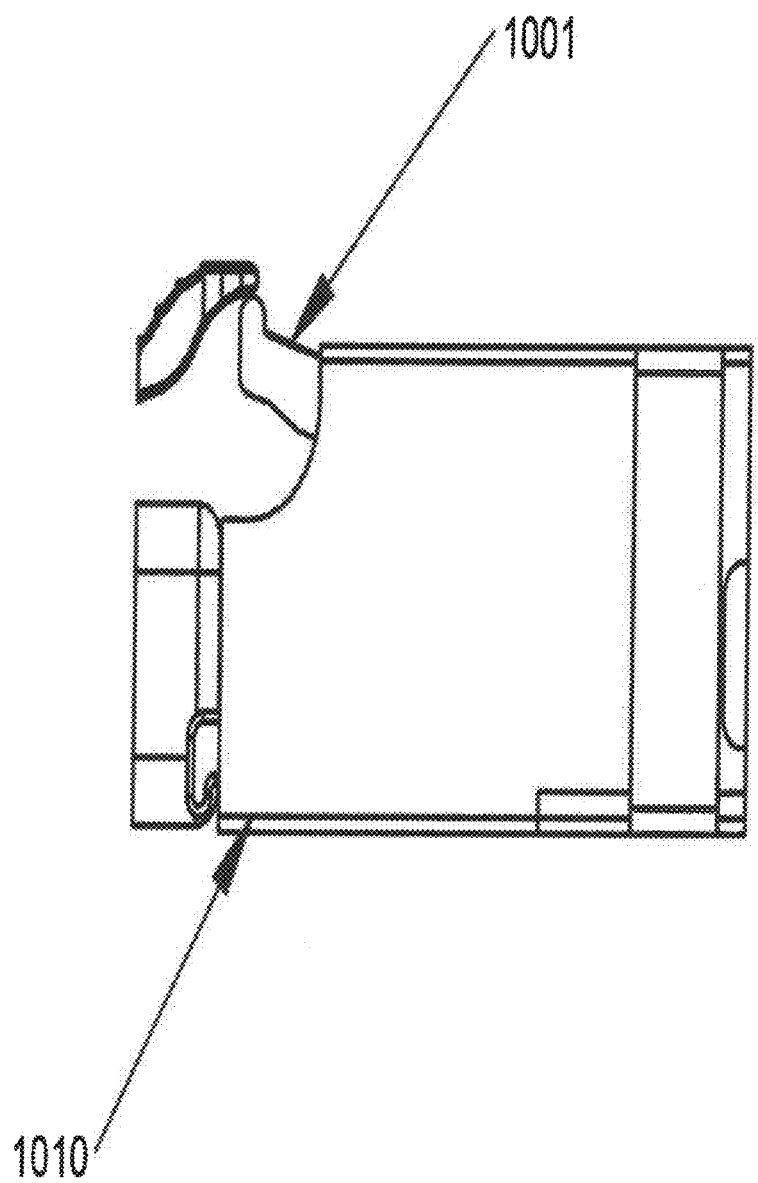
FIG. 10 is an illustrative embodiment of a connector within an adapter housing.

Referring now to FIG. 10, in some embodiments, the plug frame 1001 may be placed in an adaptor 1010. In some embodiments, in which the plug frame 1001 is within the adapter 1010, the latching member (not pictured) may not be pushed out because the walls of the adapter prevent it. Such embodiments impart additional strength to the connector specifically the plug frame 1001.

Figure 11A:
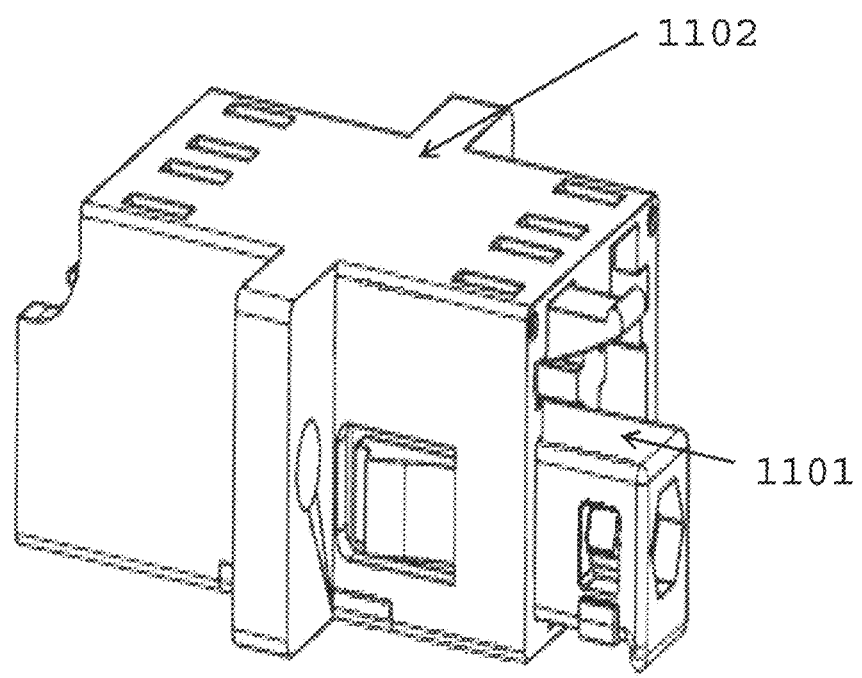
FIGS. 11A and 11B are illustrative embodiments of connectors within junior and senior sides of an adapter housing, respectively.
Figure 11B:
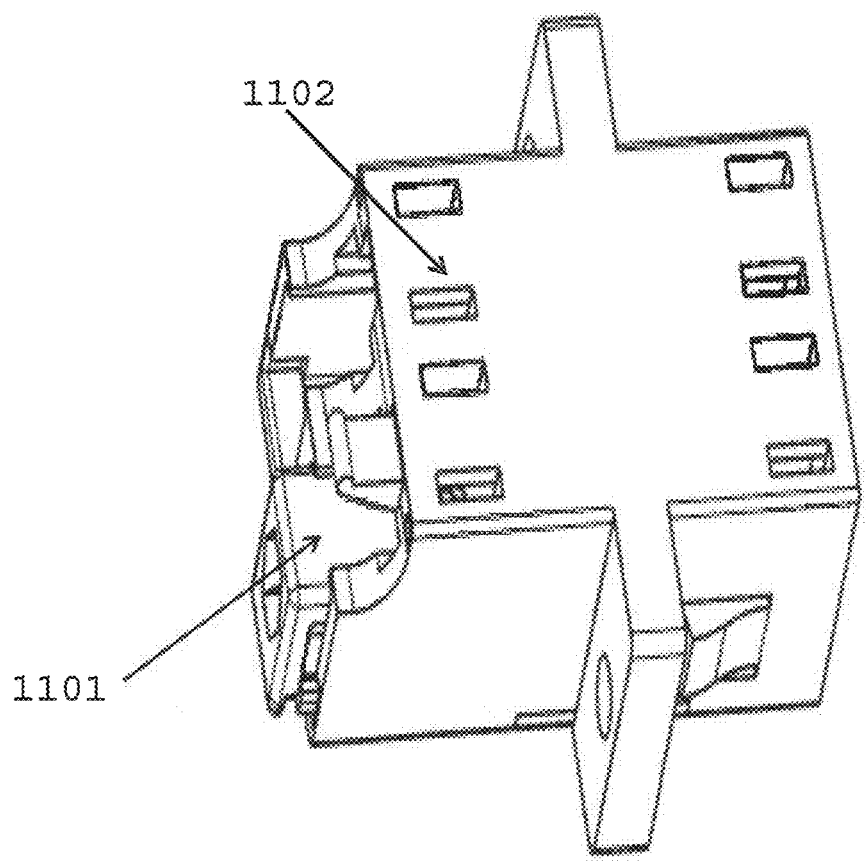
Figure 11C:
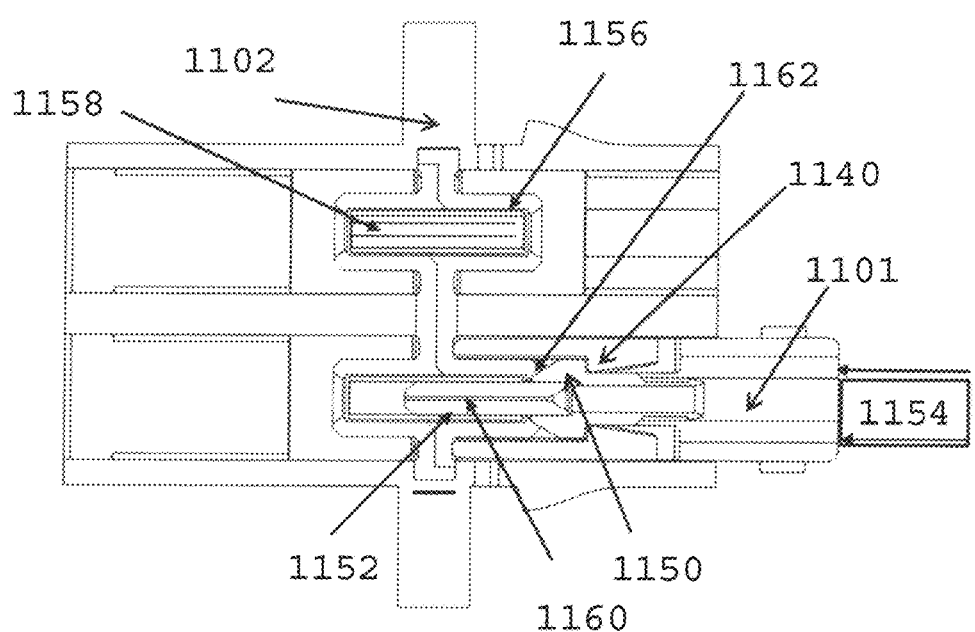
FIG. 11C is a cross-sectional view of a connector within an adapter housing.

Referring now to FIGS. 11A-C, additional views of an optical connector 1101 inserted into an adapter 1102 are depicted. In FIG. 11A, the connector 1101 is positioned in the junior side of the adapter 1102. In FIG. 11B, the connector 1101 is positioned in the senior side of the adapter 1102. Both connectors have a ferrule 1152 that upon insertion into either adapter side, engages an opening 1158 of a resilient member 1156 (FIG. 11C). The resilient member 1156 is configured to expand and secure the ferrule 1152, while aligning the ferrule 1152.

FIG. 11C shows a typical resilient member 1156, which, in an embodiment, may be fabricated from zirconia or a high strength polymer. The resilient member 1156 has a length, inner diameter and outer diameter. When the connector 1101 is inserted into the adapter 1102, the leading tip of the ferrule 1152 enters the resilient member 1156 opening 1158, and the ferrule 1152 outer diameter being larger than the ferrule 1152 inner diameter, the ferrule 1152 expands the resilient member 1156 circumferentially. The engagement of the distal end of the annular collar 1150 is stopped at an outer surface 1162 of the resilient member 1156. This helps ensure the annular collar 1150 is seated correctly, so when the resilient latch 1140 returns to its original or relaxed, unflexed position, the latch 1140 is seated just in front of the proximal side of the annular collar 1150, and secures the ferrule flange (402, 602) from being dislodged if unintentionally hit.

The expansion of the resilient member depends on the modulus of the resilient member 1156 material and a width of an optional cut (shown by the pair of solid lines 1159) that runs lengthwise along the resilient member 1156, in FIG. 11C.

In the cross-sectional view of FIG. 11C, it can clearly be seen that plug latch 1140 is positioned adjacent the exterior wall of the plug frame of connector 1101 (also shown at 608). As such, the plug latch 1140 is constrained by adapter 1102 from flexing outward and releasing the annular ferrule collar 1150. Thus, when the connector is inserted in the adapter, the constraint of the adapter prevents movement of the ferrule 1152 within the plug frame. This constraint further secures the ferrule 1152 within the resilient member 1156.

A central bore 1154 receives the annular collar 1150. The central bore 1154 is also shown in FIG. 11A, where the inner dimensions of the bore 1154 match the outer dimensions of the extended collar 206 or annular ferrule collar 1150. The annular ferrule collar 1150 is generally round or annular and can contain surface features to aid in placement in the plug frame. The ferrule collar 206 is shown in FIG. 2 with a hexagonal outer dimensional appearance. Other outer surface features may be used without departing from the scope of the invention. A typical purpose of these features is to aid in connector assembly.

Figure 12A:
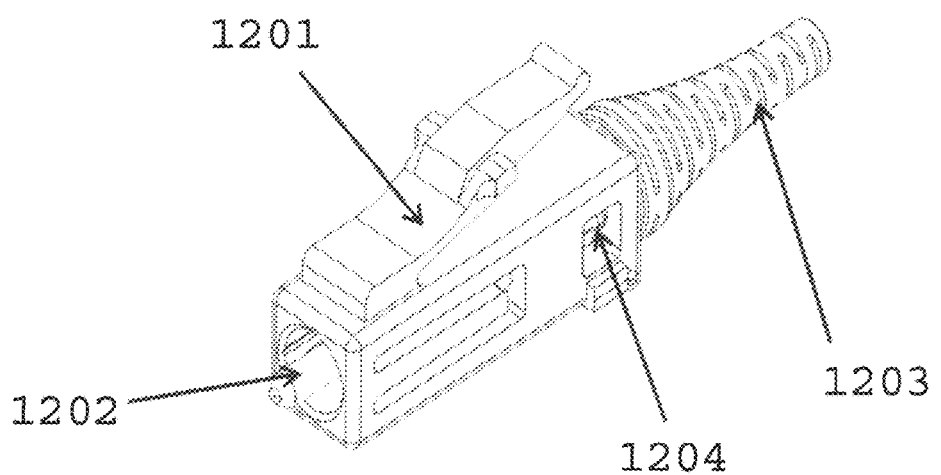
FIGS. 12A, 12B, 12C, and 12D show embodiments of a connector with an optional boot according to a further embodiment.
Figure 12B:
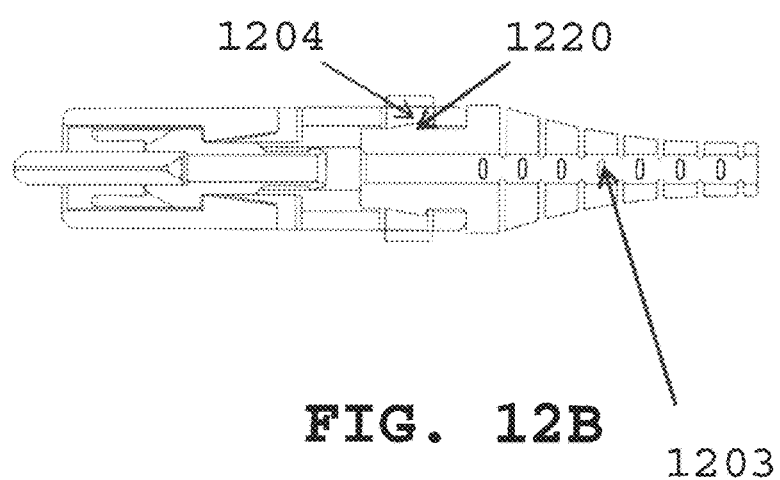
Figure 12C:
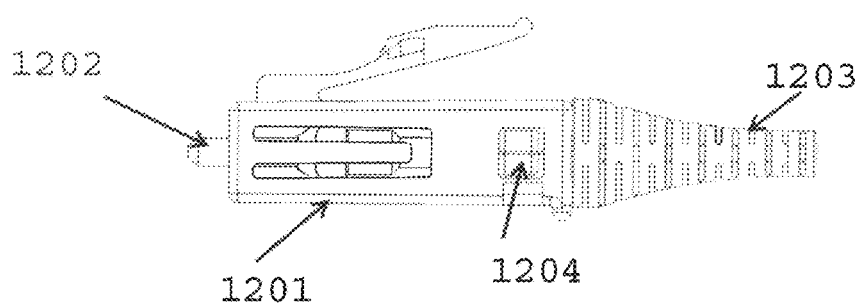
Figure 12D:
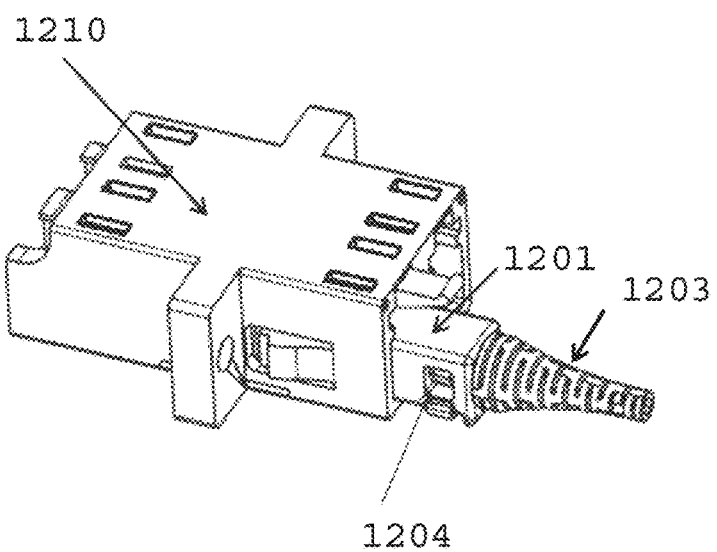

Depending upon the application environment of the optical connectors of the various embodiments, that is, both embodiments with a spring and embodiments without a spring, it may be desirable to affix a boot to the optical connector to protect optical fibers positioned therein. This may be a consideration when forces that may be applied to the optical fibers could damage or break the fibers so that the extra protection that, a boot provides may be desirable. As seen in FIGS. 12A-12D, an optional boot 1203 may be affixed to the optical connector 1201. As with previous embodiments, the optical connector 1201 includes a ferrule 1202. To affix the boot to the connector, apertures 1204 are provided. As best seen in FIG. 12B, engagement projections 1220 provided at the distal end of the boot 1203 are inserted into connector apertures 1204 to retain the boot in a position extending from the proximal end of the connector plug frame. In both the side view of FIG. 12C and the adapter/connector assembly view of 12D, apertures 1204 with engagement projections 1220 are clearly depicted.

Figure 13A:
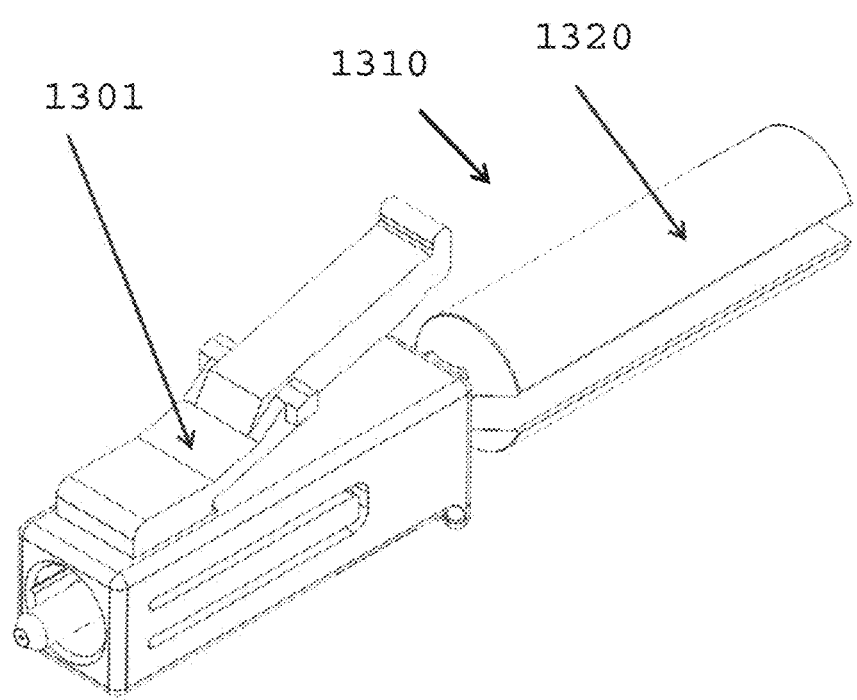
FIGS. 13A and 13C depict an optical connector with a connector insertion tool.
Figure 13B:
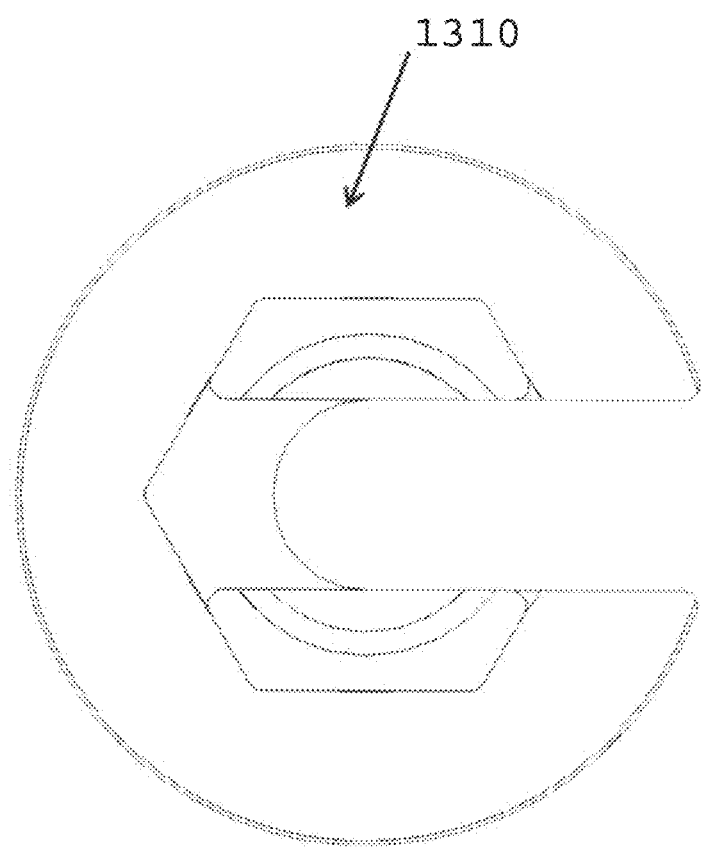
FIG. 13B depicts a cross-section of the insertion tool.
Figure 13C:
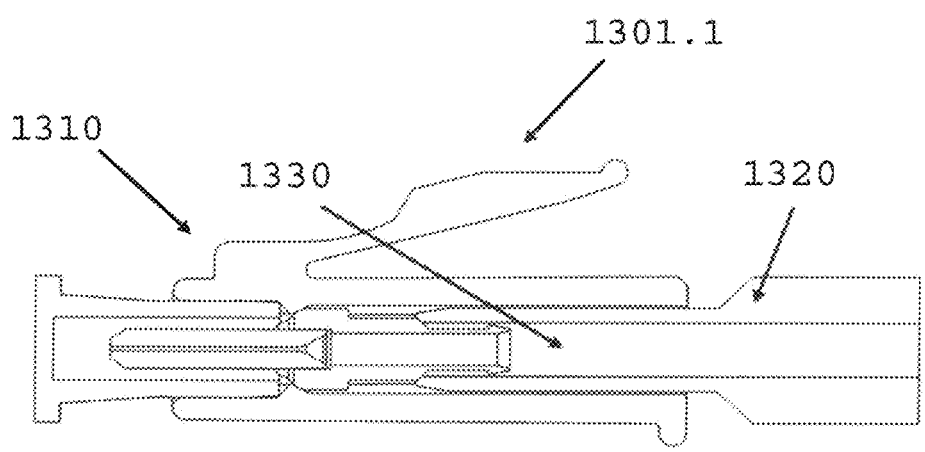

To facilitate assembly of the ferrule within the plug frame, an insertion tool 1310 is provided as seen in the several views of FIGS. 13A-13C. In FIG. 13A, the handle 1320 of insertion tool 1310 is visible as the tool is inserted within optical connector 1301. To accommodate optical fiber, insertion tool 1310 features a generally C-shaped cross-section as seen in FIG. 13B, with various cross-sectional shapes along its length to receive the ferrule and the ferrule collar. As seen in FIG. 13C, the distal end portion 1330 of the insertion tool 1310 features a reduced cross-section so that the tool may be inserted into the bore of connector 1301 to position the ferrule therein.

Figure 14:
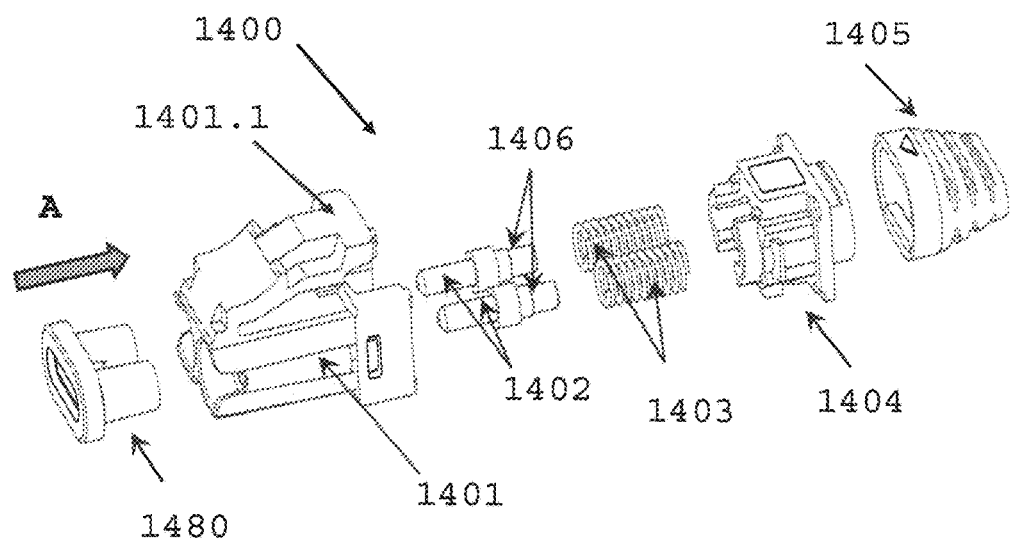
FIG. 14 is an exploded view of a connector according to an embodiment of the invention.

Referring to FIG. 14, an exploded view of a connector according to the present invention shows a dust cap 1480 may be inserted into a front body 1401 at the proximal end, in the direction of the arrow "A". The dust cap prevents debris from contacting a ferrule that may interfere with a fiber optic signal. The front body 1401 further comprises a latch 1401.1. The latch engages an inside surface of adapter 2340, as shown in FIG. 15B, to secure the connector 1400 in the adapter. The connector further comprises a pair a ferrules 1402, ferrule flanges 1406, ferrule spring 1403 and back-body 1404 with a boot 1405 covering the ferrules and back body attaching to the front body 1401 to form the connector 1400. The connector 1400 is sometimes called a bend-latch connector wherein the latch 1401.1 bends down when inserted into an adapter. Once inserted, the latch snaps into the adapter housing opening as shown and described in FIG. 15B.

Figure 15A:
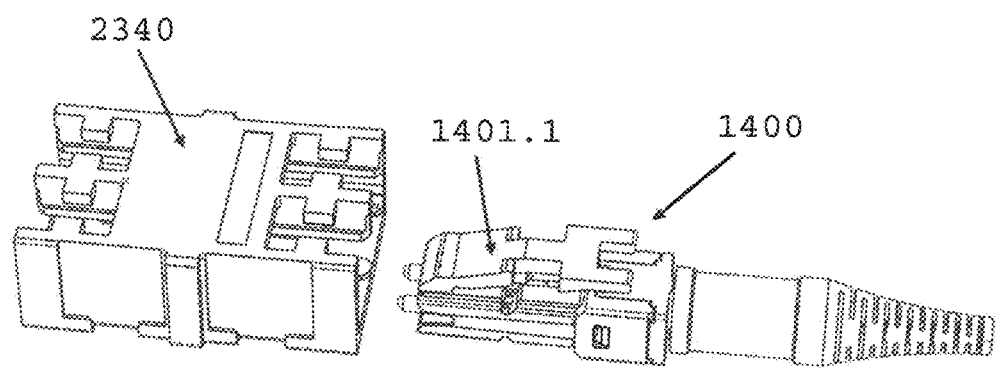
FIG. 15A is a perspective view of an adapter and an assembled connector of FIG. 14 just prior to insertion into an adapter.
Figure 15B:
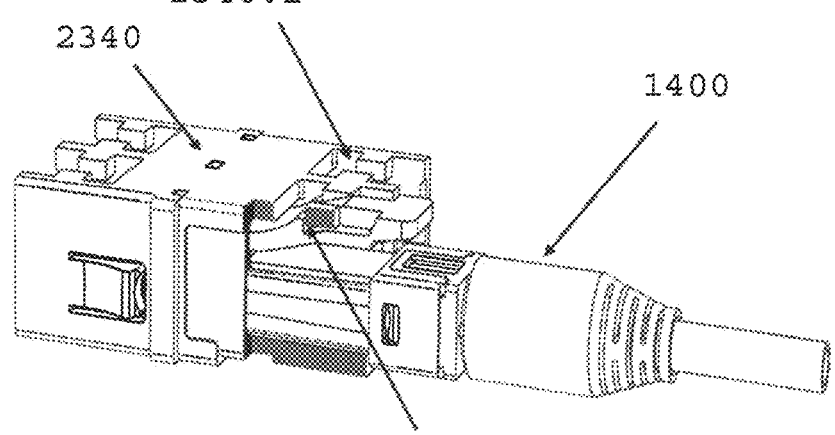
FIG. 15B is a cross-section view of an adapter with the connector of FIG. 14 inserted and latched in adapter.

Referring to FIG. 15A, the connector 1400 with an alternative latch 1401.1 is shown prior to insertion into an adapter 2340. Referring to FIG. 15B, the connector 1400 is inserted into the adapter. A latch surface 1401.2 engages an adapter surface 2340.1 that secures the connector 1400 in the adaptor 2340.

Figure 16A:
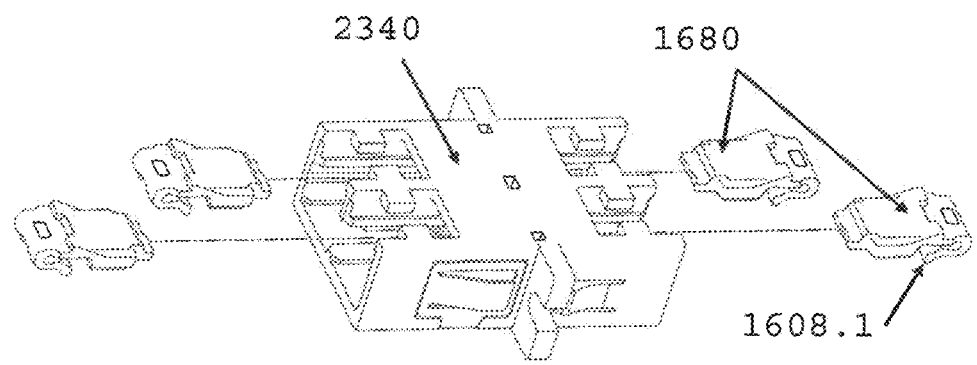
FIG. 16A is an exploded view of the adapter in FIG. 15A with a plural of hooks prior to insertion into an adapter.
Figure 16B:
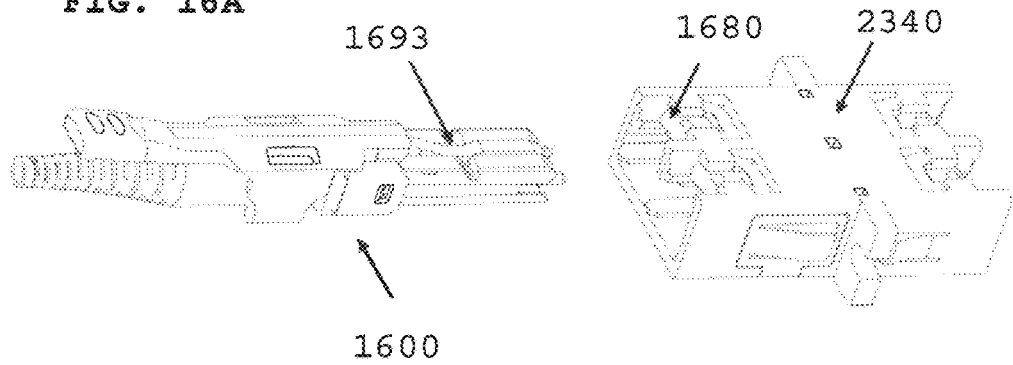
FIG. 16B is a perspective view of a connector according to an embodiment of the present invention prior to insertion into the adapter of FIG. 15A with a plural of hooks inserted into an adapter.

Referring to FIG. 16A, the adapter 2340 may accept a hook engagement device 1680. Referring to FIG. 16A, a hook surface 1680.1 locks into a widthwise groove 1693 on a front body 1701 of the connector 1600 as shown in FIG. 16B, which secures the connector 1600 into the adapter. The connector 1600 is sometimes called a pull tab connector as shown by a pull tab 1791 (refer to FIG. 17A) interacting with groove 1693 to unlock the connector (1600, 1700) from the hook surface 1680.1 located within the adapter 2340.

Figure 17A:
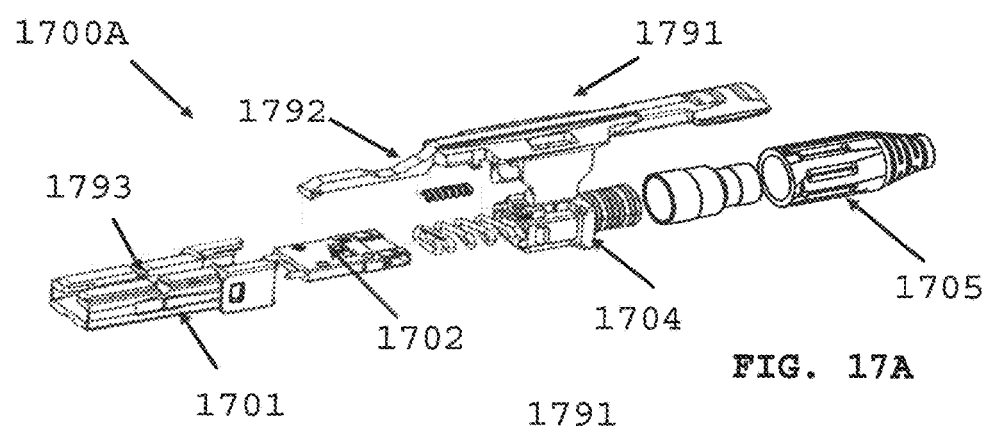
FIG. 17A is an exploded view of a connector according to an embodiment of the present invention.

Referring to FIG. 17A, an exploded view of a pull tab connector 1700A further comprises a ferrule assembly 1702 called a multi-port optical ferrule or MPO ferrule. The connector 1700A further comprises a widthwise groove

Figure 17B:
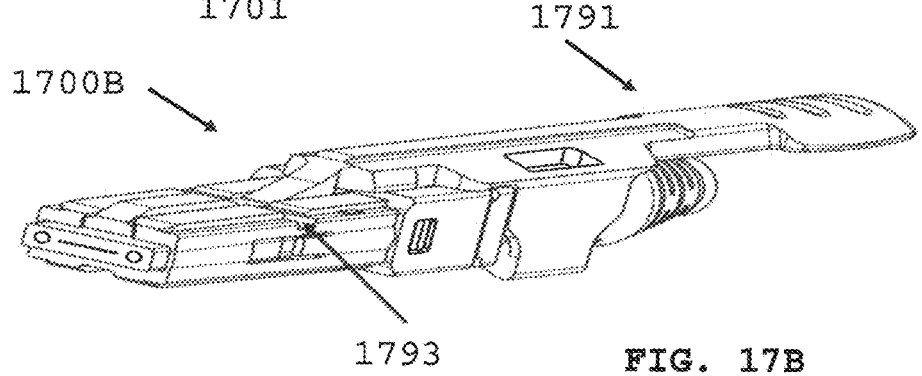
FIG. 17B is a view of the assembled connector of FIG. 17A.

1793, a front body 1701 that comprises the groove at a top surface, the ferrule assembly 1702, a back-body 1704, and boot 1705 is used to cover and secure the aforementioned components to the front body 1701. This connector 1700A further comprises a pull tab 1791 that comprises a ramp area 1792. The ramp area unlocks the connector from the hook surface 1680.1 when the pull tab 1791 is pulled rearward away from the adapter. Referring to FIG. 17B, the connector 1700A is assembled 1700E illustrating the widthwise groove 1793 and pull tab 1791.

Referring to FIG. 18A, a connector 1700B and a connector 1400 are inserted into a simplex adapter 1800A at opposing ends. The connector 1700B, as described above engages and secures to a hook 1680 inserted into the adapter 2340. Referring to FIG. 18B, a pair of connectors 1700B and connectors 1400 are inserted into a duplex adapter 1800B at opposing ends. These connectors extend beyond the adapter because of the additional structure such as boot 1405 and pull tab 1791. A connector 1700B may be swapped with connector 1400 on the opposing side without departing from the scope of the present invention. The present invention behind-the-wall connector is substantially shorter than the connectors 1700B or 1600 or 1400 as shown in FIGS. 19A-19C.

Figure 19A:
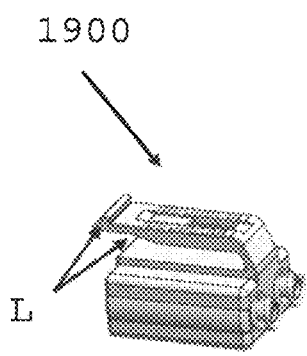
FIG. 19A is a perspective view of a behind-the-wall connector.
Figure 19B:
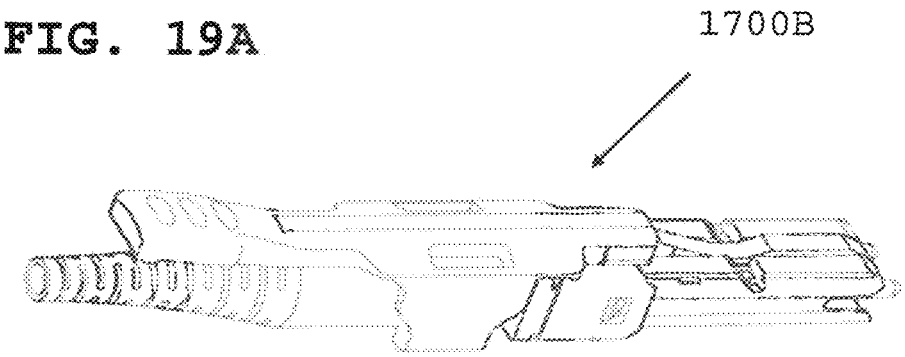
FIG. 19B is a perspective view of a pull tab connector.
Figure 19C:
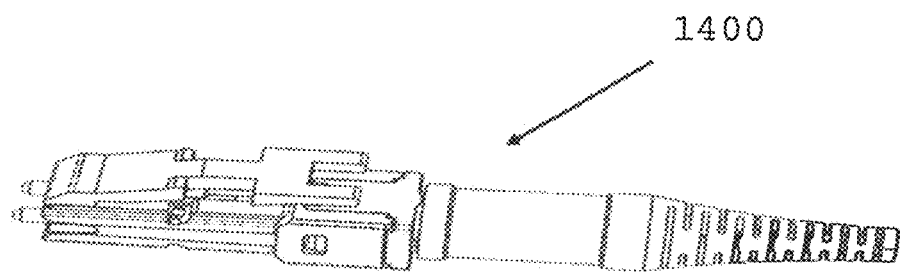
FIG. 19C is a perspective view of a bend latch connector.
Figure 19D:
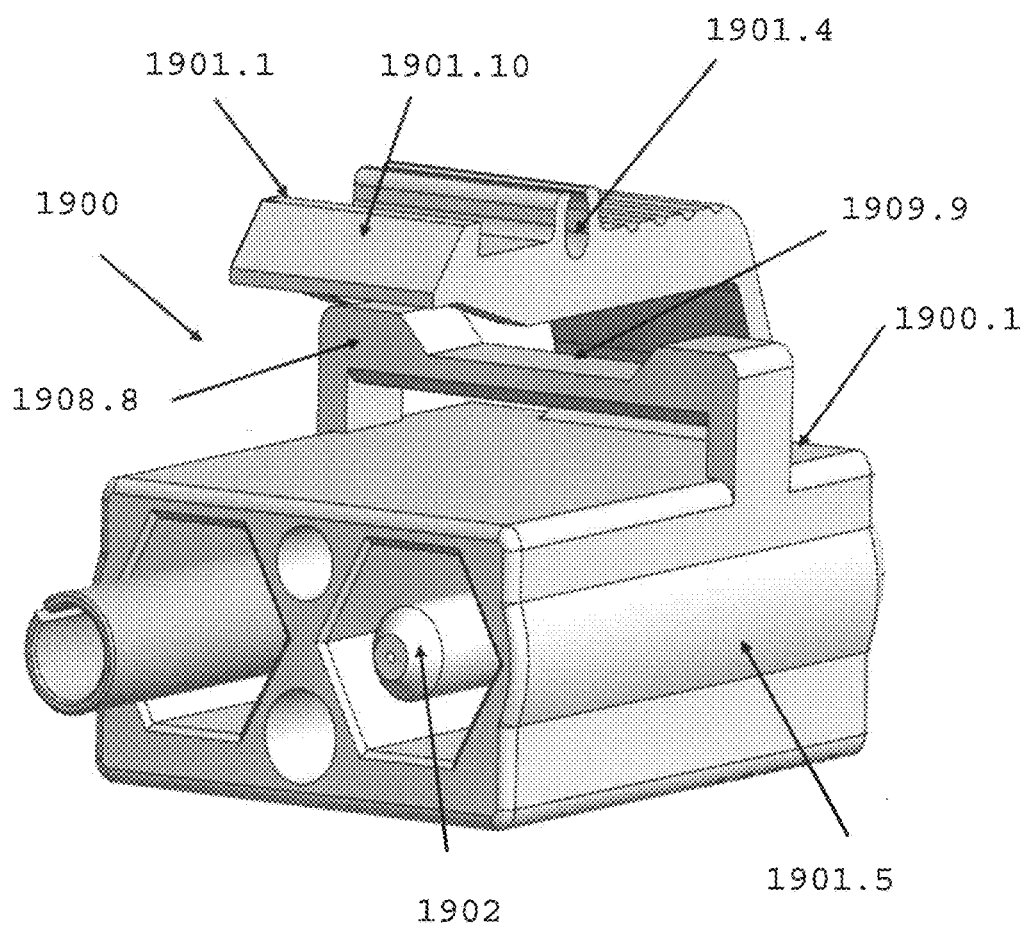
FIG. 19D is a perspective view of a behind-the-wall connector at a proximal end.

Referring to FIG. 19A, another embodiment of the behind-the-wall connector (100, 300) is shown. Connector 1900 does not include a boot assembly (105, 205). Connector 1900 comprises a latch 1901.1 that extends a predetermined distance "L" beyond the connector housing to ensure the connector 1900 mates within an adapter (not shown), while minimizing overall connector length exposed outside of adapter (not shown), as shown in FIG. 19A as compared with FIGS. 19B and 19C. Like connector 900 of FIG. 9, the boot assembly is excluded in the behind-the-wall connector 1900. Comparing connector 1700B as shown in FIG. 18B, the connector 1900 is substantially shorter in length and more compact, even as compared with connector 1400 as shown in FIG. 19C. Referring to FIG. 19D, connector 1900 further comprises a housing 1900.1 with a mating surface 1901.5 configured to mate with an inner surface of a shroud 2474 (refer to FIG. 24). The connector 1900 comprises a latch 1910.1 attached to one side of the housing 1901.1. The latch further comprises a widthwise locking groove 1901.4 that accepts a catch 2601.1 of a pull tab 2600 (refer to FIG. 26), a guide 1908.8 to slidably hold the pull tab in place, and guide recess 1909.9 accept a portion of the depressed latch structure during pull tab release of the connector from adapter. The locking groove 1901.4 is sized to snap in the catch upon depressing the catch into the groove, and removing the catch from the groove by prying the catch out of the groove. The latch 1901.1 further comprises a chamfer or inclined surface 1901.10 that engages a corresponding adapter surface upon insertion of connector into adapter (not shown). The surface 1901.10 pushes the latch downward upon contact with corresponding adapter structure for an essentially resistant free insertion.

Figure 20A:
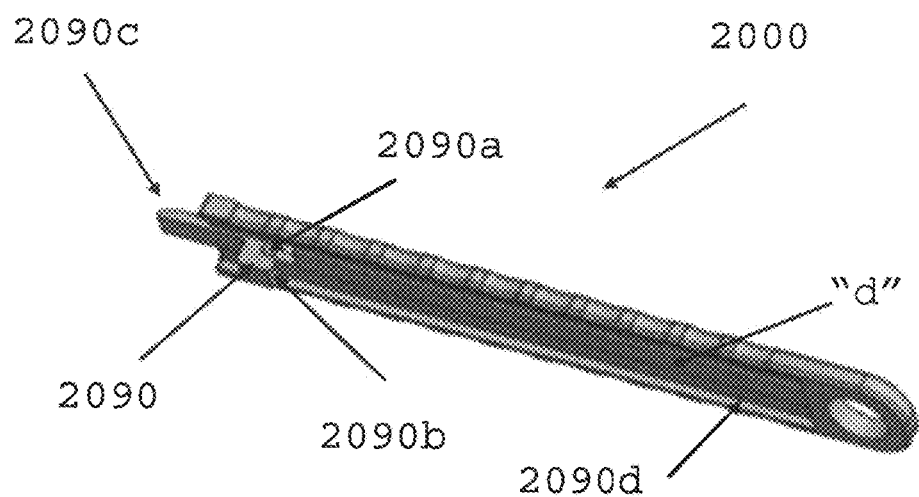
FIG. 20A is a perspective view of a removal tool.
Figure 20B:
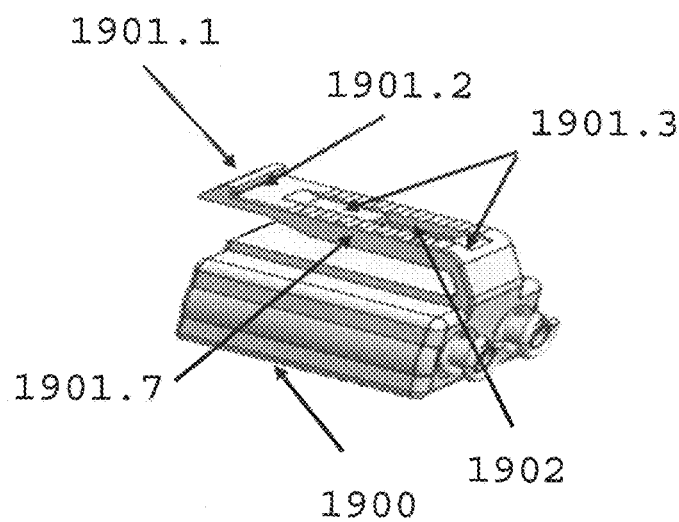
FIG. 20B is a perspective view of the behind-the-wall connector.
Figure 23:
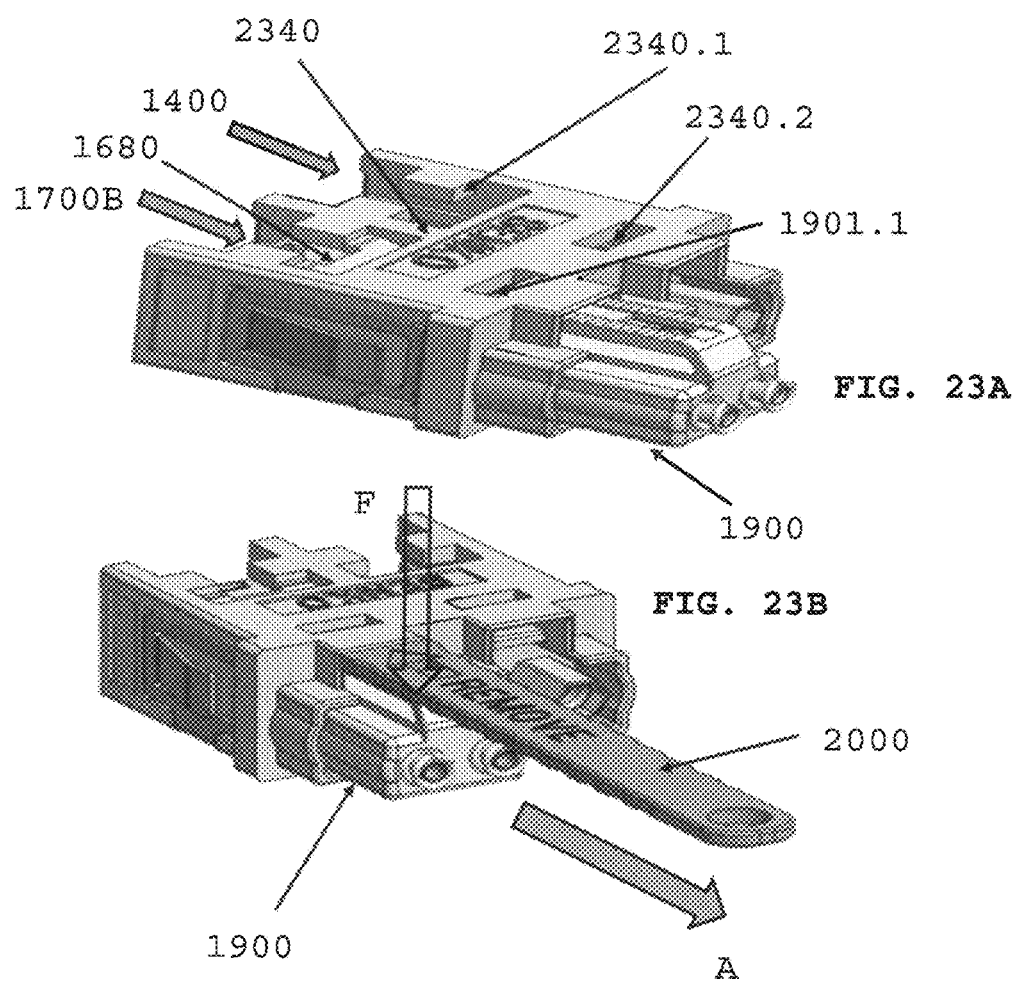
FIG. 23A is a perspective view of the behind-the-wall connector of FIG. 20B latched into an adapter.
FIG. 23B is a perspective view of connector and adapter assembly of FIG. 23A with the removal tool of FIG. 20A attached to the behind-the-wall connector.

Referring to FIG. 20A, removal tool 2000 is configured to engage the connector 1900 via a protrusion 2090 configured to be inserted an opening 1902 (refer to FIG. 20B). Pulling tool 2000 rearward in a direction "R" (FIG. 21), depresses latch 1901.1 (refer to FIG. 20B), which releases connector 1900 from adapter 2340 as shown in FIG. 23A. Referring to FIG. 20A, removal tool 2000 and its protrusion 2090 further comprise a cutout 2909a and a stop surface 2090b. The cutout 2090a engages a latch inner surface 1901.6 (refer to FIG. 24), and pulling on the tool 2000 in a direction "A" of the arrow (refer to FIG. 23B) will release the connector 1900 from the adapter 2340. The stop surface adds strength to the removal tool when it engages the latch inner surface and the tool is pulled to release the connector 1900.

Figure 21:
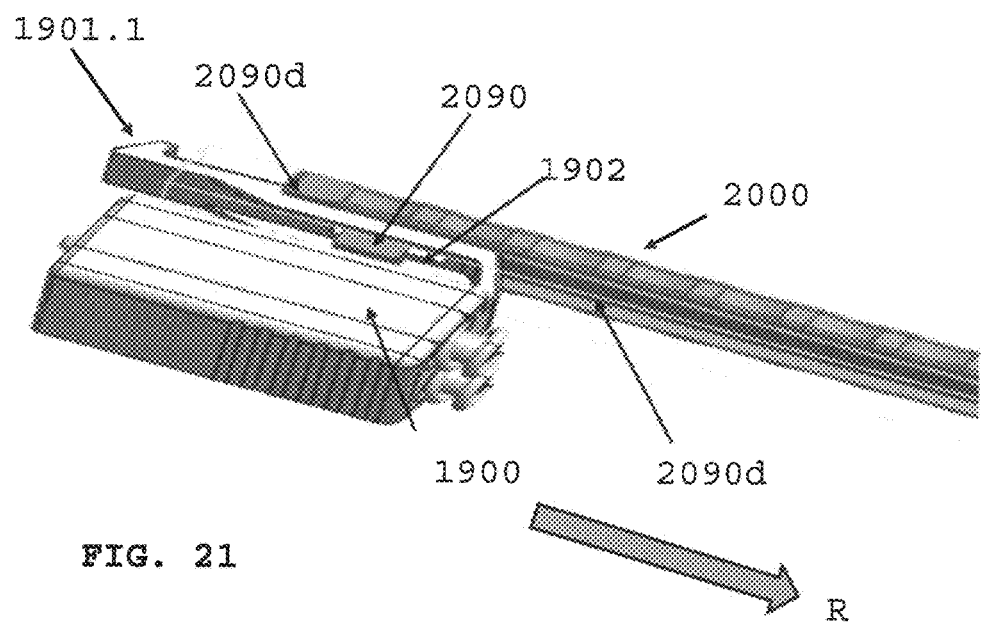
FIG. 21 is a perspective view from the bottom of the removal tool of FIG. 20A attached to the behind-the-wall connector of FIG. 20B.
Figure 22:
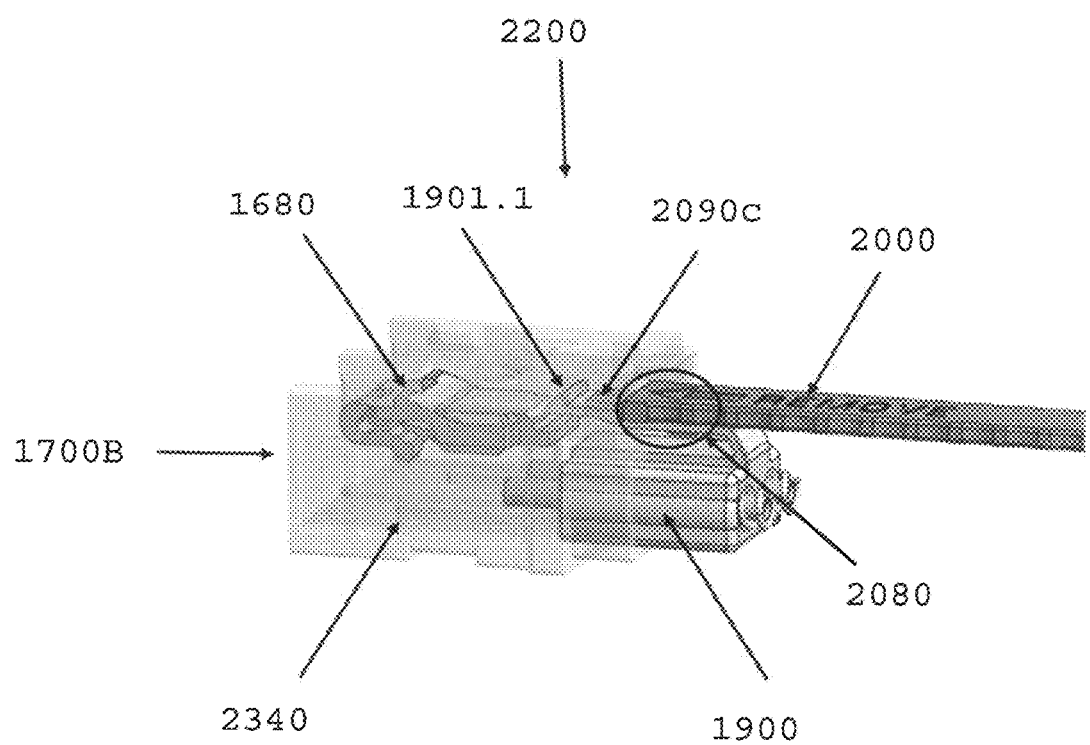
FIG. 22 is a transparent view of the connector assembly of FIG. 21 inserted into the adapter of FIG. 16A on a first side, with a hook inserted therein on the opposing side of the behind-the-wall connector on a second side.

Referring to FIG. 20B, the connector 1900 comprises an opening 1902 configured to receive the protrusion 2090, a channel 1901.3 configured to receive an alignment tab 2090c that helps ensure the tool 2000 does not get stuck in the adapter, and protrusion 2090 is configured to be received in opening 1902. Referring to FIG. 21, the protrusion 2090 is shown inserted into opening 1902 of the connector 1900. Referring to FIG. 20A, a projection 2090d runs lengthwise along underside or attachment side to a connector of the removal tool. The projection is on both inner sides and projects inward. This allows projection 2090d to engage a side face 1901.7 of the latch 1901. The width of the projection opening defines a distance "d" between the projections 2090d (refer to FIG. 21) and "d" is sized to engage a top surface of the latch 1901.1. Projection 2090b captures the latch side face 1901.7 to secure tool 2000 and help prevent it from sliding widthwise across the latch and getting jammed in the adapter. This is also shown in FIG. 22 at 2280. Returning to FIG. 21, the tool 2000 is secured to latch 1901.1 by side projections 2090d and protrusion 2090 that extends through latch opening 1902.

Referring to FIG. 22, adapter 2340 comprises a connector 1900 inserted and latched into a first port, and an opposing adapter port or opening comprises connector 1900 with removal tool 2000 attached thereto. The projections 2090d are shown in the call out 2280 as further securing and stabilizing the tool 2000 to latch 1901.1. The alignment tab 2090c is shown engaged in the channel 1901.3 to help ensure tool 2000 does not become jammed in the adapter. If the tool becomes jammed, the connector would be likely destroyed or damaged along with the adapter itself, upon dislodging the jammed tool. The opposing side of the adapter 2340 shows a hook 1680 in an adapter port. The hook 1680 can accept connector 1700B and mate the fiber optic pathways contained in the ferrules of the connectors 1700B and 1900 to form a signal path. Without departing from the scope of the invention, the hook 1680 can be removed and a connector 1400 can be secured and latched into the adapter port in place of connector 1700B, and form the same signal path with the connector 1900.

Figure 24:
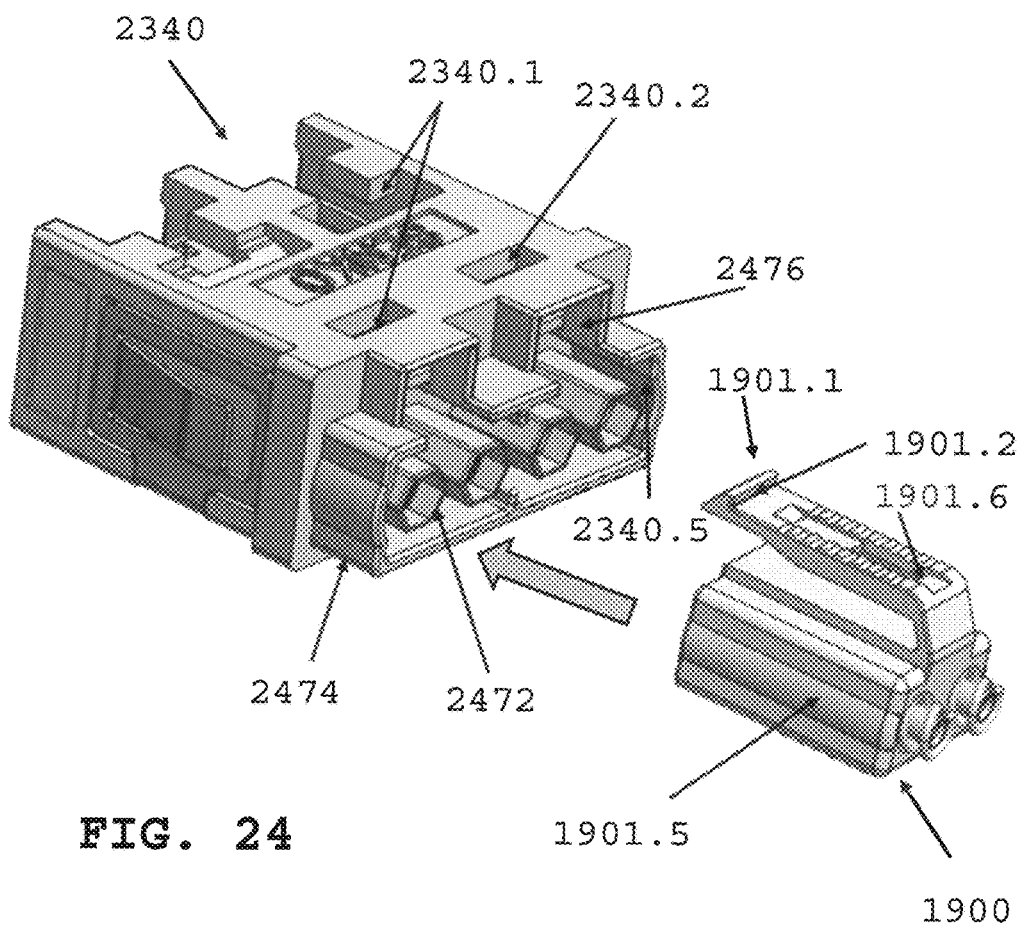
FIG. 24 is a perspective view of the behind-the-wall connector prior to insertion into an adapter.

Referring to FIG. 23A, connector 1900 is shown in of a duplex adapter 2340, with a hook 1680 in an opposing port to the connector 1900. The adapter port with a hook can accept a connector 1700B, and a connector 1400 can be inserted in an adjacent port that does not contain a hook 1680. The adapter comprises an opening 2340.2 further comprising an adapter latching surface 2340.1 that engages a corresponding latch face 1901.2 (refer to FIG. 20B) thereby securing connector 1900 into the adapter 2340. Referring to FIG. 23A, removal tool 2000 is not inserted onto connector 1900. Referring to FIG. 23B, the connector 1900 with a removal tool 2000 is inserted in a first port of duplex adapter. The adapter is also shown in FIG. 24. Pulling on the tool 2000 in a direction "A" of the arrow would remove the connector 1900 from the adapter. Pulling on tool 2000 in direction "A" imparts a downward force "F" on latch 1901.1 separating latch face 1901.2 from within adapter opening 2340.2.

Referring to FIG. 24, an embodiment of an adapter comprises an outer shroud 2474, a ferrule flange alignment sleeve 2472, a latch opening 2476, and a channel 2340.5 configured to accept a corresponding mating surface 1901.5 on an outer housing of the connector 1900. These features help ensure connector 1900 when inserted into an adapter port is aligned so the latch 1901.1 will secure into adapter opening 2340.2 and a latch face 1901.2 will engage and lock with a corresponding adapter latching surface 2340.1.

Figure 25A:
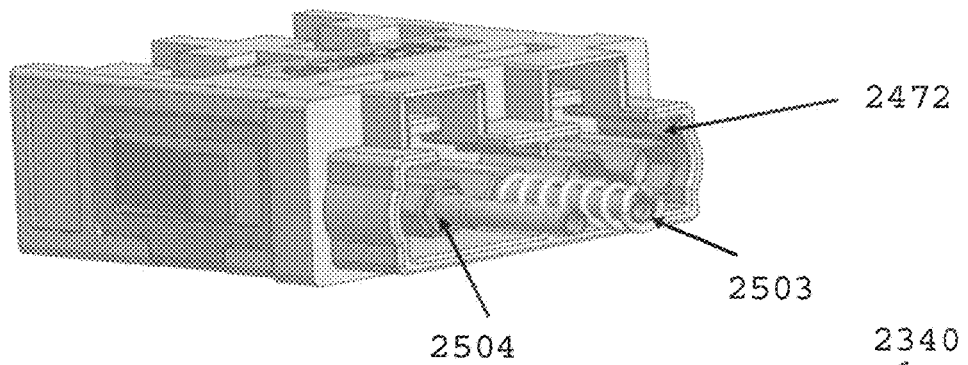
FIG. 25A is a perspective view of the adapter of FIG. 24 with a ferrule flange and ferrule flange with a spring inserted on the flange.
Figure 25B:
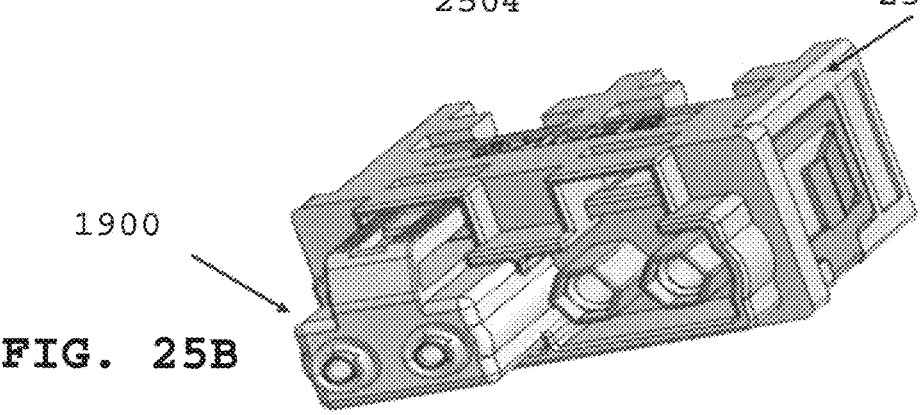
FIG. 25B is a perspective view of the connector and adapter system of FIG. 24 where the connector is inserted into the adapter.

Referring to FIG. 25A, the adapter of FIG. 24 further comprises a ferrule flange 2504 inserted into the ferrule flange alignment sleeve 2472, and further comprises a spring 2503 over ferrule flange 2504. The connector outer housing is not shown. Referring to FIG. 25B, the connector 1900 is fully inserted and latched into adapter 2340.

Figure 26:
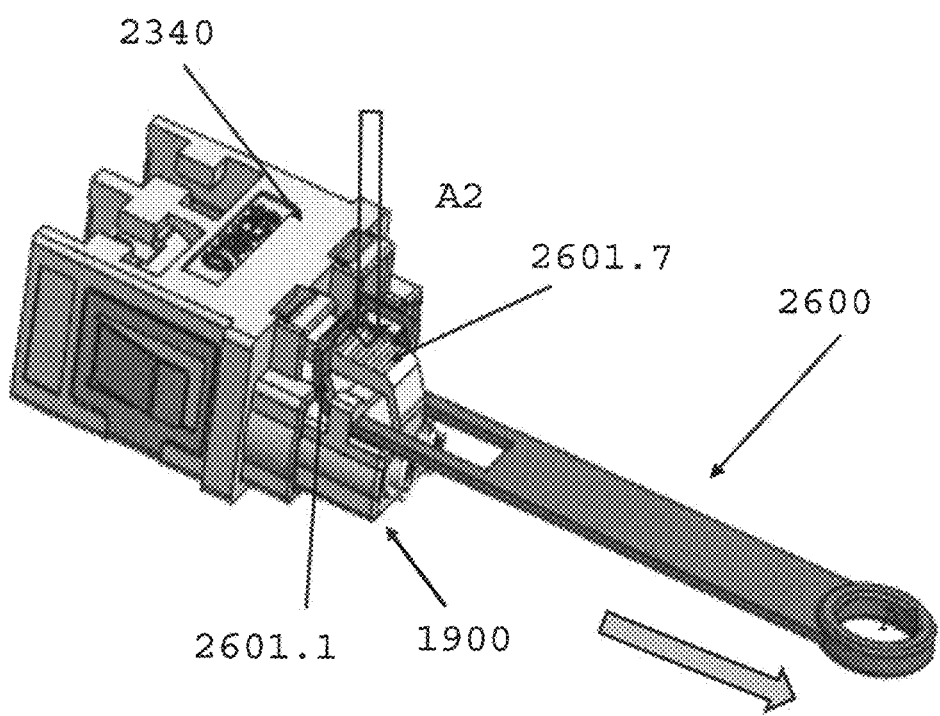
FIG. 26 is a perspective view of a behind-the-wall connector with a pull tab attached to a connector latch for removal of the connector from an adapter.

Referring to FIG. 26, a pull tab 2600 is configured to attach to latch 1901.1 of connector 1900. A proximal end of the pull tab 2600 further comprises a catch 2601.1 that engages a groove 2601.7 running widthwise on the latch top surface. As the pull tab 2600 is moved in a direction of arrow "A1", the catch forces the latch down in the direction of arrow "A2", and this releases the connector 1900 from the adapter 2340.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from, the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term, "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more") ; the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In an instance where a convention analogous to "at least one of A, B, or C, et cetera" is used, in general such a construction is intended in the sense one having skill in the art would understand the convention (for example, "a system, having at least one of A, B, or C" would include but not be limited to systems that have A alone, B alone, C alone, A and B together, A and C together, B and C together, and/or A, B, and C together, et cetera). It will be further understood by those within the art that virtually any disjunctive word, and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terns of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down, into a lower third, middle third and upper third, et cetera. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A behind-the-wall optical connector comprising:
a housing having a first end portion that is sized and shaped to be received in an adapter/transceiver receptacle and a second end portion spaced apart from the first end portion along a length of the housing, the housing defining a longitudinal opening having an open end through the first end portion of the housing;
a ferrule is contained in the longitudinal opening and having a free end portion adjacent the first end portion of the housing and exposed through the open end of the longitudinal opening such that the free end portion of the ferrule is configured to mate with a ferrule alignment sleeve of the adapter/transceiver receptacle when the first end portion of the housing is received in the adapter/transceiver receptacle;
a latch projecting from the second end portion of the housing toward the first end portion of the housing, and wherein the latch extends a distance "L" beyond the first end portion of the housing to connect into the adapter/transceiver receptacle reducing the overall length of connector exposed outside of adapter/transceiver receptacle.

2. The behind-the-wall optical connector of claim 1, wherein the housing further comprises an outer surface configured to mate with an inner surface of a shroud for aligning the ferrule with the ferrule alignment sleeve.

3. The behind-the-wall optical connector of claim 1, wherein the latch is integrated with an exterior wall of the housing such that positioning the optical connector in an port of an adapter/transceiver receptacle prevents movement of the connector within the adapter/transceiver receptacle.

4. The behind-the-wall optical connector of claim 1, wherein the ferrule is an LC ferrule.

5. The behind-the-wall optical connector of claim 1, wherein the latch has a proximal end portion that is connected to the second end portion of the housing and a free distal end portion.

6. The behind-the-wall optical connector of claim 5, wherein the proximal end portion of the latch comprises a transverse section that projects outwardly from the housing.

7. The behind-the-wall optical connector of claim 6, wherein the latch comprises a longitudinal section that extends from the transverse section to the distal end portion in a direction generally parallel to the length of the housing.

8. The behind-the-wall optical connector of claim 7, wherein the longitudinal section is everywhere spaced apart from the housing.

* * * * *